US012219092B2

(12) United States Patent
Chiu et al.

(10) Patent No.: US 12,219,092 B2
(45) Date of Patent: Feb. 4, 2025

(54) EMERGENCY RESPONSE SYSTEM WITH DYNAMIC ALI DATABASE ALPHANUMERIC CHARACTER HACKING

(71) Applicant: Ross Medical Corporation, Little Falls, NJ (US)

(72) Inventors: Alexander Ross Chiu, Oakland, CA (US); Alexander Douglas Fahrenbach, Upper Saddle River, NJ (US)

(73) Assignee: Ross Medical Corporation, Little Falls, NJ (US)

( * ) Notice: Subject to any disclaimer, the term of this patent is extended or adjusted under 35 U.S.C. 154(b) by 0 days.

(21) Appl. No.: 18/142,755

(22) Filed: May 3, 2023

(65) Prior Publication Data

US 2023/0336661 A1    Oct. 19, 2023

Related U.S. Application Data

(63) Continuation of application No. 17/474,518, filed on Sep. 14, 2021, now Pat. No. 11,683,416.
(Continued)

(51) Int. Cl.
*H04M 3/51* (2006.01)
*H04W 4/90* (2018.01)

(52) U.S. Cl.
CPC ........... *H04M 3/5116* (2013.01); *H04W 4/90* (2018.02)

(58) Field of Classification Search
CPC .. H04M 3/5116; H04M 2242/04; H04W 4/90; H04W 76/50; G08B 25/106
(Continued)

(56) References Cited

U.S. PATENT DOCUMENTS 8,630,680 B2 * 1/2014 Frederiks .............. H04W 74/02
370/328
9,313,637 B2   4/2016 Mitchell, Jr. et al.
(Continued)

FOREIGN PATENT DOCUMENTS

EP    1741279 B1    5/2015
GB    2568004 A8    5/2019
(Continued)

OTHER PUBLICATIONS

International Search Report and Written Opinion for PCT/US2021/050220 dated Feb. 1, 2022.

*Primary Examiner* — Maria El-Zoobi
(74) *Attorney, Agent, or Firm* — Hansen IP Law PLLC

(57) ABSTRACT

An improved emergency response method and system are shown and described. A content-specified text field-such as a caller name field—an ALI database record for a communication device is updated to include information about a person experiencing an emergency and the emergency. A PSAP receiving an emergency services call from the communication device receives the caller name field on a terminal display and is thus informed about the emergency via a alphanumeric character communication rather than orally. A particular emergency may be assigned a code that is put in the caller name field. A PSAP operator receiving the emergency services call may then enter the code into an emergency services web interface to retrieve information about the emergency including service provider credentials, the person's medical condition, the person's medical records, real time physiologic data, treatment facility names, treatment facility types, a location of the emergency, a level of care, a videoconference web link, on-site personnel names, disaster information, and hazard information. The code can be transmitted to first responders and downstream medical professionals to enhance their ability to deliver (Continued)

emergency services. The system and method provide a means for legacy PSAPs to receive the benefits of Next Generation 911 systems without the infrastructure changes that would otherwise be required.

14 Claims, 12 Drawing Sheets

Related U.S. Application Data

(60) Provisional application No. 63/077,787, filed on Sep. 14, 2020.

(58) Field of Classification Search
USPC ........................................................ 455/404.1
See application file for complete search history.

(56) References Cited

U.S. PATENT DOCUMENTS

| | | |
|---|---|---|
| 9,408,046 B2 | 8/2016 | Morin et al. |
| 10,681,208 B2 | 6/2020 | Nelson et al. |
| 10,701,542 B2 | 6/2020 | Martin et al. |
| 11,683,416 B2 | 6/2023 | Chiu et al. |
| 2003/0012344 A1* | 1/2003 | Agarwal .............. H04M 11/045 379/37 |
| 2013/0138458 A1* | 5/2013 | Lorsch .................. G16H 10/60 705/3 |
| 2015/0324539 A1* | 11/2015 | Chiu ...................... G16H 40/67 705/2 |
| 2016/0183311 A1 | 6/2016 | Mitchell, Jr. et al. |
| 2016/0192160 A1* | 6/2016 | Petite ..................... H04W 4/12 455/521 |
| 2016/0323730 A1 | 11/2016 | Morin et al. |
| 2017/0337338 A1* | 11/2017 | Dunn .................... G16H 10/60 |
| 2019/0174289 A1* | 6/2019 | Martin ................... H04L 67/02 |
| 2019/0318827 A1 | 10/2019 | Chiu et al. |
| 2020/0059776 A1 | 2/2020 | Martin et al. |

FOREIGN PATENT DOCUMENTS

| | | |
|---|---|---|
| WO | 2005091906 A2 | 10/2005 |
| WO | 2005091906 A3 | 10/2005 |
| WO | 2010117604 A1 | 10/2010 |

\* cited by examiner

FIG. 2

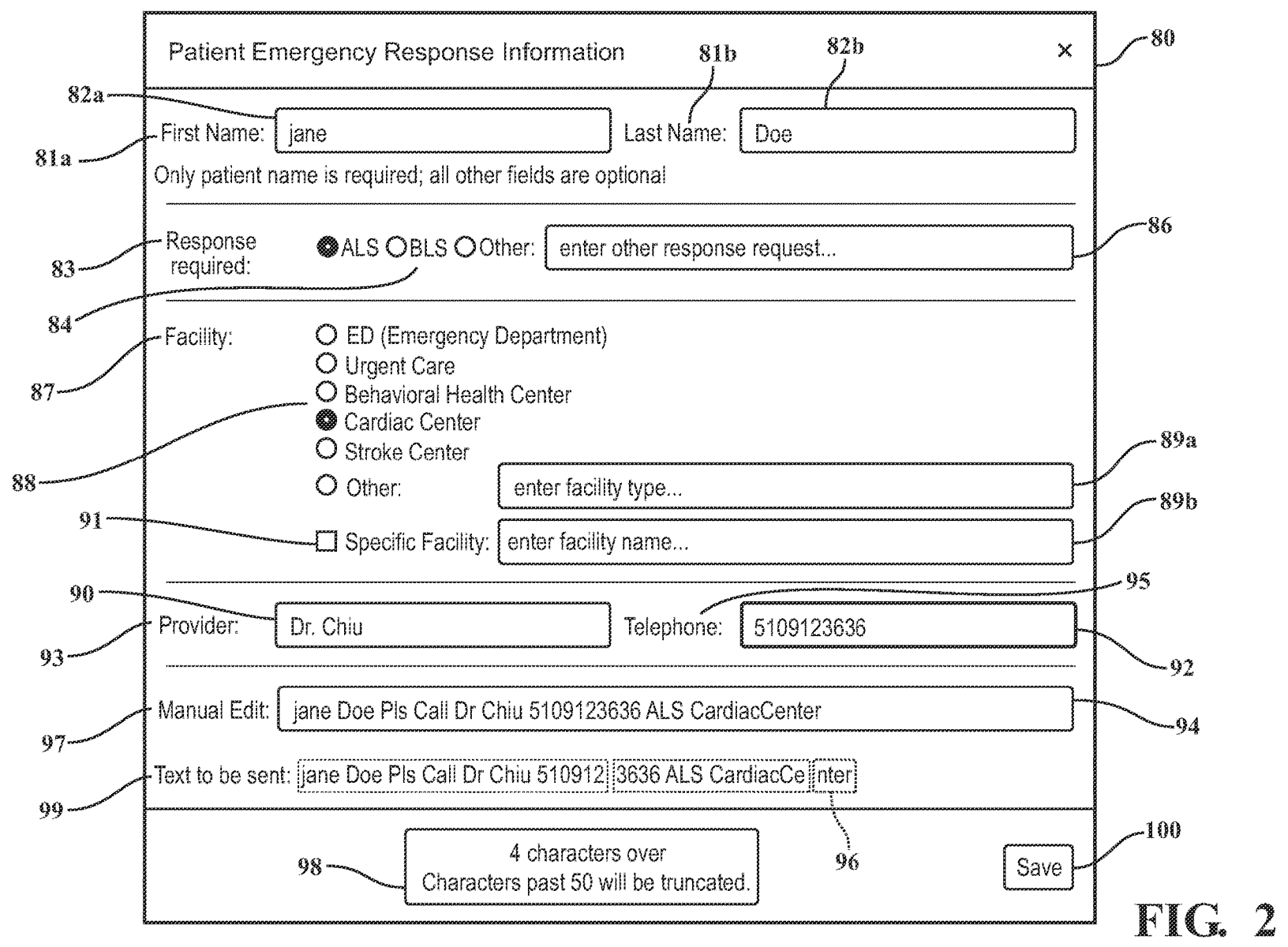

Patient Emergency Response Information  ✕

First Name: [jane]   Last Name: [Doe]

Only patient name is required; all other fields are optional

Response required: ● ALS  ○ BLS  ○ Other: [enter other response request...]

Facility:
○ ED (Emergency Department)
○ Urgent Care
○ Behavioral Health Center
● Cardiac Center
○ Stroke Center
○ Other: [enter facility type...]

☐ Specific Facility: [enter facility name...]

Provider: [Dr. Chiu]   Telephone: [5109123636]

Manual Edit: [jane Doe Pls Call Dr Chiu 5109123636 ALS CardiacCenter]

Text to be sent: [jane Doe Pls Call Dr Chiu 510912][3636 ALS CardiacCe][nter]

4 characters over
Characters past 50 will be truncated.

[Save]

Telemedicine911

Caller: Alexander Chiu, MD, MBA
MEDICAL LICENSE AND CERTIFICATIONS
- NPI #1871754937  DEA: FC3169338  CDS: D09985700
- New York License  264430-1  Expires 11/30/19
- New Jersey License  25MA09057500  Expires 6/30/19
- Emergency Medicine Board Certified  Expires 12/31/2028
- Certified in ACLS, BLS, PALS, NRP, ATLS Patient
Alexander Fahrenbach
Age 39  DOB: Dec 15, 1971
Chief Complaint: Chest Pain
Medical Problems: none

EMERGENCY RESPONSE SYSTEM WITH DYNAMIC ALI DATABASE ALPHANUMERIC CHARACTER HACKING

CROSS-REFERENCE TO RELATED APPLICATIONS

This application is a continuation of U.S. patent application Ser. No. 17/474,518, filed Sep. 14, 2021, which claims the benefit of U.S. Provisional Application No. 63/077,787, filed Sep. 14, 2020, the entirety of which is hereby incorporated by reference.

FIELD

This disclosure relates to emergency response systems, and more particularly, to emergency response systems with improved methods for providing information about an emergency to emergency services personnel.

BACKGROUND

The US 911 system is a critical service providing access to public safety and first responders in any time of need. In 2016, over 250 million calls were delivered to 911 centers across the country. Emergency services calls using 911 are automatically routed to a primary safety answering point (PSAP) that is responsible for the caller's jurisdiction. The PSAP then dispatches first responders such as police, fire, or ambulances to the caller's location to provide the required assistance.

Many US PSAPs have aging 911 systems that comprise functionally limited terminals with a fixed interface that can only display a limited number and type of data fields. The terminals are incapable of displaying video or graphics, and in many cases, are not configured to display alphanumeric characters other than in a specified number and type of fields. In the original 911 systems, the PSAP operator received no alphanumeric character information about an emergency services call. Any information about the caller's number, location, and the nature of the emergency had to be conveyed orally by the caller. In newer systems the PSAP receives an automatic number identification (ANI) value for the call on its terminal. The PSAP uses the ANI value as a call back number if the call is disconnected. The PSAP also uses the ANI value to query an automatic location identification (ALI) database that correlates communication device addresses with ANI values. For landlines or VoIP phones, the ANI value is the calling number for the communication device. For wireless devices a "pseudo-ANI" or "p-ANI" value is transmitted to the PSAP and defines cell tower information for the call. The PSAP can query the ALI database with the p-ANI value to obtain location information for the wireless communication device. While many PSAPs have this ability to obtain an alphanumeric character description of the caller's location, any additional information must be conveyed orally, which can lead to omissions and mistakes. During an emergency, it is desirable to communicate information about the emergent event and the person experiencing it to downstream personnel (doctors, nurse practitioners, EMS, police, fire) as quickly and as accurately as possible. During an emergency, it is also desirable to connect the primary care doctor and pre-emergency care team with the emergency downstream personnel to share electronic medical records including allergies, unify communications between all personnel, and grant access to real time analytics including mobile monitoring. However, acquiring even rudimentary information about the emergency typically requires the PSAP operator to receive and relay the information orally in universal legacy systems or to purchase platforms working in parallel to the universal 911 call system selectively installed in some PSAPs.

Next Generation 911 (NG 911) Systems have been proposed to allow for communication of alphanumeric characters and video as well as to provide videoconferencing and electronic medical records access. However, NG911 Systems require significant infrastructure changes, including replacing legacy PSAP terminals with terminals having full computing functionality and broadband access. It is estimated that to implement NG 911 nationwide would cost about $10 billion and take about ten (10) years. Thus, a need has arisen for a method and system that addresses the foregoing issues.

SUMMARY

In accordance with a first aspect of the present disclosure, a method of providing emergency services to a person or property experiencing an emergency is provided which comprises updating an automatic location identification (ALI) database content-specified text field in an ALI database record that includes a calling number field with a calling number of a communication device, wherein the updating step comprises adding alphanumeric characters indicative of the nature of the emergency to the content-specified field. In certain preferred examples, the content-specified text field is a caller name field. In the same or other preferred examples, the alpha numeric characters comprise a code that encodes information regarding the nature of the emergency.

In accordance with a second aspect of the present disclosure, a method of dispatching emergency services to a person experiencing an emergency is provided. The method comprises receiving a alphanumeric characters string in a content-specified field on an emergency services call interface on a PSAP 911 terminal, wherein the alphanumeric characters string includes an alphanumeric code; launching an emergency services website on an internet-connected computer having a display; entering the alphanumeric code in an interface of the emergency services website to access information selected from at least one of service provider credentials, information identifying the person experiencing the emergency, real time physiologic data for the person experiencing the emergency, medical records for the person experiencing the emergency, a treatment facility name, a treatment facility type, a service provider phone number, a level of care, and a videoconference link on the display; and dispatching emergency services personnel to the person experiencing the emergency based on the accessed information. In certain preferred examples, the content-specified text field on the emergency services call interface on the PSAP 911 terminal is a caller name field.

In accordance with a third aspect of the present disclosure, a system is provided which comprises at least one emergency services server, the at least one emergency services server comprising at least one processor and at least one non-transitory computer readable memory having computer executable instructions stored thereon, wherein when executed by the at least one processor, the computer executable instructions perform the following steps: receiving an alphanumeric characters string indicative of a content of a content-specified automatic location identification (ALI) database text field and a nature of the emergency; and updating a content-specified (ALI) database text field in an ALI database record that includes a calling number field with a calling number with the alpha numeric characters string indicative of the content of the content-specified ALI database text field and the nature of the emergency, wherein the content of the content-specified ALI database text field is not the nature of the emergency, such that when a call is placed by entering 911 into the communication device, a public safety answering point (PSAP) receiving the call can display the updated ALI database caller name field on a PSAP 911 terminal.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

FIG. 2 is a depiction of a computer-generated interface for entering information about an emergency in accordance with a first example of a method for providing emergency services;

FIG. 5A is a webpage from the emergency services job file website of FIG. 4 used to display medical professional credentials and patient identity, date of birth, and medical information;

FIG. 5B is a webpage from the website of FIG. 4 used to convey medical history information for a patient;

FIG. 6 is a depiction of the computer-generated interface of FIG. 2 in accordance with a second example of a method for providing emergency services;

DETAILED DESCRIPTION

The systems and methods described herein use "text field hacking" to add information or a code used to encode that information into a content-specified text field in a database, the contents of which are transmitted to a PSAP operator or another emergency services provider. The methods and systems described herein thus provide a more standardized way of communicating information to a person or entity to whom an emergency services call is being handed off to provide more accurate communications and better emergency services outcomes.

Figure 1:
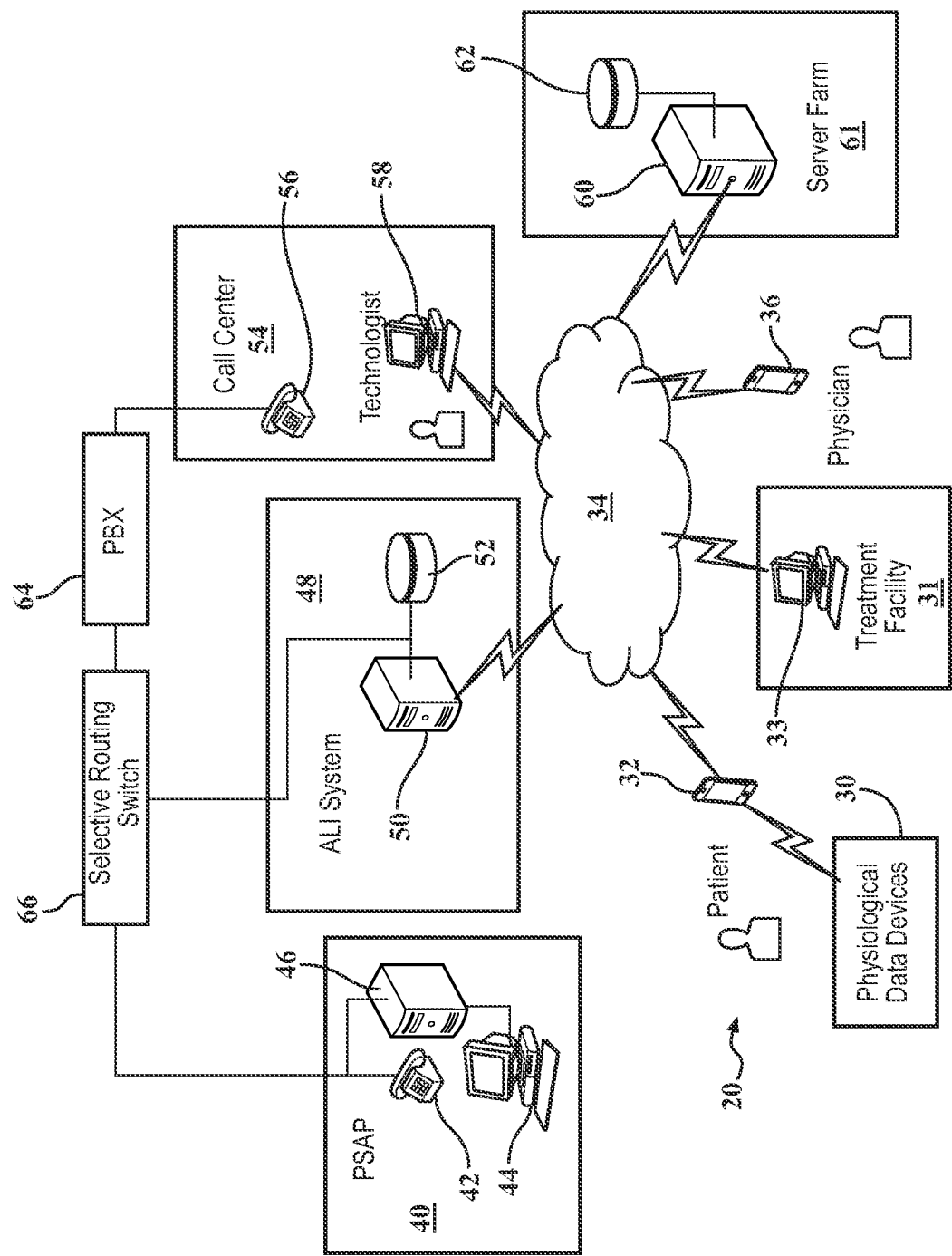
FIG. 1 is a depiction of a first embodiment of an improved system for providing emergency services.

Referring to FIG. 1, a system 20 for providing emergency services to a patient with a medical condition (or a person experiencing some other kind of emergency) is provided. System 20 optionally comprises one or more physiological data devices 30 used to make various physiological measurements of the patient, an emergency services server farm 61, a call center 54, an automatic location identification ("ALI") system 48, a public safety answering point or "PSAP" 40, a Private Branch Exchange or "PBX" 64, and a selective routing switch 66. System 20 also includes a computer network 34, which is preferably a wide area network ("WAN") and even more preferably the internet. As discussed in greater detail below, system 20 allows a person making an emergency services call to add alphanumeric characters to a content-specified text field in his or her communication device's ALI database record in order to convey information about the emergency to the PSAP servicing the jurisdiction in which the emergency is occurring. The term "content-specified text field" means that the field has a particular type of content for which it has been designated. Examples of content-specified text fields include a call back number field, an address field, a caller name field, location fields such as a latitude field and a longitude field, and a type of call field specifying whether the call is on a landline, VoIP or mobile phone. The call will generally be made using an emergency services number such as 9-1-1 (U.S.), 9-9-9 (U.K.), and 1-1-2 (Germany, Denmark, Iceland, Sweden), which is a number used to place emergency services calls having an abbreviated length relative to the standard phone number length in the particular jurisdiction. In some jurisdictions, there are multiple emergency services numbers depending on the nature of the requested emergency services (police, ambulance, or fire). As used herein, the phrase "emergency services number" may also refer to a special abbreviated phone number used to handoff responsibility from one entity to another, such as from a telemedicine provider to a PSAP or from a PSAP to a telemedicine provider or other medical services provider. For example, numbers such as 2-1-1 or 3-1-1 could be used for such handoffs. The emergency services call is placed using a communication device, which may comprise a device capable of carrying on oral communications with a remotely located person and which is assigned a calling number (typically a ten digit number in the US) that uniquely identifies it. As used herein "phone" or a "communication device" is a capable of transmitting and receiving voice and communications over a public switched telephone network, a cellular network, or the Internet, and includes a landline phone, a VoIP phone, a wireless phone, a tablet computer, a desktop computer, a laptop computer, or a smartphone. A full 911 data console with audio, video, and alphanumeric characters capabilities may also comprise a communication device or a phone.

PSAP 40 dispatches the necessary emergency responders (fire, police, ambulance) to the patient in response to a voice call, and in some examples, receives patient location data related to the voice call. A PSAP will typically include several PSAP operators each with a terminal 44 and a phone 42. Only one phone 42 and terminal 44 are shown in FIG. 1. A PSAP 40 may also include at least one PSAP server 46 to facilitate the transmission, receipt, and storage and display of data related to emergency calls.

Many current PSAPs have PSAP terminals 44 that are configured to display the data contained in content-specified text fields of ALI database records in order to convey specific information about an emergency services call, and the display format and displayed data are not readily reconfigurable. The PSAP terminals 44 are operatively connected to a private branch exchange 64 and an ALI system 48 via a selective routing switch 66. ALI database 52 records include a variety of information related to communication devices, including a calling number in a calling number field. One or more location fields are also provided and typically define the location of the communication device, although in various examples herein, the location fields define the location of a person experiencing an emergency, not the location of the communication device used to place the emergency services call. At any given time, the calling number field value uniquely corresponds to one physical communication device. However, a given communication device may have more than one calling number associated with it.

Most if not all ALI database formats include text fields that are designated for specified content. For example, a caller name alphanumeric characters field is a type of content-specified text field provided in most if not all ALI database formats. In many ALI database configurations the caller name field accommodates up to 30 characters. It has been found that the caller name alphanumeric characters field can be manipulated or "hacked" to include some information about an emergency beyond the normal contents of the field (i.e., the caller's name) or to include an alphanumeric characters string emergency job code giving access to vast information about the emergency including unified telecommunications and monitoring. While the location field(s) are typically alphanumeric characters fields, it has also been found that many if not all ALI databases do not allow non-location alphanumeric characters information to be entered into them because they are configured to conform to master street address guide (MSAG) addresses. It also believed that aside from the location field(s), the caller name field is the only alphanumeric characters field in many ALI databases which is consistently displayed across all PSAP terminals in the United States, and in particular legacy terminals that have not been upgraded to NG911. As a result, it is further believed that the caller name field is uniquely suited to being manipulated to include additional alphanumeric characters information about an emergency relative to other ALI database fields.

In certain implementations, when an emergency services call is received, a PSAP terminal 44 receiving the call also receives an ANI value for the call, and the PSAP can use the ANI value to send a query to ALI system 48. The ALI server 50 queries the ALI database 52 with the ANI value to retrieve the location of the communication device that placed the call from the location field (or fields) in the ALI database 52 record that has a calling number field value that is the phone number of the communication device that placed the call. In certain implementations, the ten digit telephone number may be defined by a three digit area code in an NPA field and a seven-digit phone number in a calling number field. Thus, "calling number field" should be understood to refer to the field or fields that collectively define the entire ten-digit phone number assigned to a communication device. In response to the PSAP's query, the contents of the location field(s) are then received by PSAP terminal 44. In addition, in the methods and systems described herein, the data in the caller name field for the ALI database record of the phone experiencing an emergency is transmitted to and displayed on PSAP terminal 44. The caller name field is preferably "hacked" to include additional information about the nature of the emergency services call. While the caller name field is presently preferred because of its transmission to PSAPs, any content-specified text field in the ALI database can be used as long as the data in the field is transferred to the PSAP and as long a there are no particular restrictions on the formatting of the text in the field which preclude "hacking" it, such as the MSAG format restrictions described above for location fields.

Many PSAP terminals 44 and/or ALI database records are limited to 30 characters for the caller name field. The information that may be added to the caller name field in the ALI database 52 record for the incoming call may include, for example, at least one of a medical condition, a medical test result, a medical diagnosis, a medical professional, a medical facility, current medications, allergies, prior diagnoses, a type of medical response, a level of care, a direction to a first responder, and a web address. In some cases, some of this information is provided directly in the caller name field. In other cases, it is encoded as described further below. In examples where an emergency services call is placed by a third party for a person experiencing an emergency, the caller name field will also preferably be updated to include the name of the person experiencing the emergency, although it may include the third party's name as well.

An example of the contents of a caller name field is provided in caller name transmission alphanumeric characters field 96 in FIG. 2. In the example the caller name transmission field 96 includes the name of a person needing emergency services ("Jane Doe"), the name of a medical professional ("Dr. Chiu"), the medical professional's phone number ("5109122636"), a level of care ("ALS"), and a type of medical facility ("CardiacCenter"). However, a portion of the type of medical facility exceeds the character limit of the ALI database's caller name field, so that after updating, the field would only be populated with a portion of the type of medical facility, which is "CardiacCe".

In certain implementations, a third party will make an emergency services call on behalf of a person experiencing an emergency, such as the "patient" of FIG. 1. In one example, the third party may be a technologist at a call center 54 who has a technologist terminal 58 with or without a separate phone 56. The terminal 58 may be a dummy terminal operating off of another computing system or may itself be a fully-functional computer with one or more processors, RAM, ROM, and storage for data and programs (e.g., hard drive). In such third party calling implementations, the call will be routed to the PSAP 40 responsible for the jurisdiction in which the patient, not the third party caller (and his or her communication device) is located. In another example, a service provider such as a physician with a physician communication device 36 may place the emergency services call for the patient. The physician's communication device 36 is preferably capable of transmitting data to and receiving data from an emergency services server 60 that is operatively connected to a patient location database 62. In one implementation, the data is transmitted over the Internet. Again, however, the call will preferably be routed to the PSAP 40 servicing the jurisdiction in which the person experiencing the emergency (e.g., "patient") is located, not to the PSAP servicing the location of the third party caller and third party communication device. In examples in which the location field(s) of a communication device's ALI database record are updated, they may be updated multiple times with different location data to allow a third party caller to contact multiple PSAPs, which may be beneficial in the case of a disaster such as an earthquake, flood, hurricane, tornado, etc.

ALI system 48 is generally a known type of ALI system used in enhanced 9-1-1 systems and is configured to provide a address data from one or more location field(s) to PSAP 40 based on an ANI or p-ANI value received from the PSAP 40. The specificity of the address information contained in the location field(s) of any particular ALI database record may vary and may include a street name, street number, city name, and state name. The ALI record may also include cell phone radiolocation coordinates (a cell tower site and sector) and global positioning system coordinates (e.g., a longitude and latitude). In certain implementations described herein, ALI records may be supplemented to include further specific patient location information such as a building number (e.g., an internal address within a complex of buildings), a floor number, and a room number. In certain jurisdictions a "master street address guide" or "MSAG" may exist which is an official record of valid streets, thoroughfares, house numbers and communities in the jurisdiction, and the ALI database 52 records may include MSAG addresses. In other implementations involving next generation 911 (NG911) systems, the ALI record may be further supplemented to include video, voice, pictures, floorplans, and medical information data. However, the system and method of the present disclosure allows such information to be provided to PSAP 40 without the infrastructure required for NG911 systems.

ALI system 48 comprises one or more servers 50 and one or more ALI databases 52. The ALI system 48 stores location information for emergency services callers and provides it to PSAP 40 to better enable the PSAP 40 to dispatch the necessary emergency responders to the correct location. In typical known systems, the PSAP 40 receives a voice call and a telephone number associated with the call known as an "ANI" or "Automatic Number Information" value. In certain implementations, in particular those used for wireless and/or VoIP calls, the ANI is referred to as a "pseudo-ANI" or "p-ANI." The p-ANI is a string of digits, such as the ten digits in a phone number, which may be used to encode the caller's location, as may be indicated by a cell tower and sector or latitude/longitude. When a p-ANI is used, the calling number is also preferably provided to the PSAP because the p-ANI itself cannot be dialed to reach the caller. In other implementations, VoIP and other systems may use either an ANI or p-ANI to query the ALI database and obtain the caller's location.

In certain jurisdictions which use enhanced 9-1-1 systems, when the PSAP receives an emergency services call, it then transmits the ANI back to the ALI system 48 and requests the caller's location (a process sometimes called "bidding" or "dipping"). The ALI system database 52 includes fields that correspond ANI or p-ANI values to a physical location (e.g., street address, city, state or cell phone tower/sector). An ALI database 52 record for the caller is then transmitted back to the PSAP terminal 44 via PSAP server 46 to better enable the PSAP to dispatch emergency services to the location identified by the ALI database 52 record. In jurisdictions with older 9-1-1 systems, ALI system 48 may not exist, and ALI records may not be provided to the PSAP 40.

Call center 54 is connected to PSAP 40 via PBX 64 and selective routing switch 66. Physician's communication device 36 is connected (wirelessly) to PBX 64. Selective routing switch 66 routes the call based on the updated ALI record to the PSAP servicing the patient's location. PBX 64 is a private telephone network used within an enterprise or company, and its users share outside lines for making telephone calls external to the PBX 64. Selective routing switch 66 and ALI System 48 are typically operated by an emergency services provisioning provider. PBX 64 determines whether a particular voice call is an emergency services call or a non-emergency services call. If the call is an emergency services call, the selective routing switch 66 routes the call to a selected PSAP 40, which is preferably the PSAP 40 servicing the jurisdiction in which the patient is located at the time the patient experiences a potential medical event. Selective routing switch 66 utilizes a selective routing database (SRDB) (not shown) to route the call to the PSAP servicing the location defined by the ALI information. Physician's communication device 36 is programmed to transmit an updated ALI record for device 36 to ALI system 48 so that the ALI record associated with physician's communication device 36 corresponds to the patient's location.

Certain known SRDBs for landline applications use the ANI associated with an emergency call (i.e., the telephone number from which the call is made) to determine the correct PSAP to which the call should be routed. In certain existing applications for landline emergency callers, the ANI is uniquely associated with the caller's address in the ALI database 52 and the ANI can be used to properly route the emergency call. However, in certain implementations of system 20, call center phone 56, technologist terminal 58, physician communication device 36 or some other third party communication device will be used to place the emergency services call, despite being located remotely from the patient (or other person experiencing an emergency).

In one implementation of system 20, the SRDB (not shown) correlates ANI and p-ANI values to PSAPs. In this implementation, the correlation between ANI/p-ANI and PSAP is dynamically updated based on the location of the patient (using the updated ALI database record which now relates the ANI or p-ANI to the patient's location) so that a call from a third party communication device 36, 56, 58 is routed to the PSAP 40 in the same jurisdiction as that location. In this manner, calls originating from the third-party communication device 36, 56, 58 will appear to the PSAP to have originated from the patient's location instead of the communication device's 36, 56, 58 location. When a third-party, such as a technologist in call center 54 or a physician, determines that emergency services should be dispatched to a patient, the patient's current location may also be used to create an updated ALI database record for the third party's phone.

In another implementation of system 20, "location-based" routing is used. In this implementation, the SRDB (not shown) correlates ALI locations to PSAPs. In certain examples, the PSAPs geographic boundaries are used to determine which PSAP is responsible for the caller's location. Thus, once the ALI record for the call center phone 56 (or for whichever third party communication device is used to place the emergency services call) is updated based on the patient's location, the SRDB (not shown) uses that updated ALI record's location information to select the appropriate PSAP 40. The selective routing switch 66 then routes the call to the selected PSAP 40. In this implementation, there is no need for a database that correlates ANI values to PSAPs. The SRDB (not shown) does not need to be dynamically updated based on the caller's location because the PSAPs geographic boundaries are static (with the exception of infrequent changes made by the government). However, regardless of whether ANI-based routing or location-based routing is used, selective routing switch 66 effectively uses the patient's location to route the call placed by a third party phone to a PSAP 40 responsible for the patient's location.

In certain examples, during an emergency services call, location information for the person experiencing an emergency (the patient in FIG. 1) will be used to update the ALI database 52 record for the communication device that placed the call, e.g., call center phone 56, call center terminal 58 or physician communication device 36. As mentioned previously, the particular communication device will be identified by an ALI database record with a calling number field value that matches a phone number for the communication device. The location field(s) of that record will be updated to include the location of the person experiencing the emergency (e.g., the patient) not the location of the phone identified by the communication number field data. The updated ALI database record may be referred to as a "discordant" record because the data in the location field(s) does not correspond to and does not "accord" with the calling number field value. In one example, the third party will transmit the patient's location data to emergency services server 60 which will then create an updated ALI database record for the communication device 36, 56, 58 in which the location fields are populated with data describing the patient's location. The updated ALI database 52 record will then be transmitted to ALI database 52 and used by the selective routing database (SRDB) to route the emergency services call to PSAP 40 which services the jurisdiction in which the patient is located.

In other implementations, information transmitted from the patient to the third party will be provided to emergency service server 60 which will then query a patient location database 62 to obtain a current location for the patient. That location will then be used to update the ALI database record for the communication device 36, 56, 58. The patient location database 62 preferably includes a plurality of records for each patient, with each record including a patient's name and/or numeric identifier and an expected location for the patient at a particular date and time. Examples of such records are included in U.S. Pat. No. 10,380,324, the entirety of which is hereby incorporated by reference.

In additional examples, emergency services server 60 is configured to place an emergency services call on behalf of a patient or other person (or property) experiencing an emergency. In one such example, a physician updates an ALI database 52 record for the server 60 itself via an appropriate website interfacing with the server 60. The server 60 then sends a single-use phone number to the doctor's communication device 36. The physician enters the single-use number into communication device 36 to place a call to emergency services server 60. The server 60 either routes the call to PSAP 40, which is responsible for the patient's jurisdiction or places a call to PSAP 40 and then patches the physician into the call. The emergency services server 60 would have an ALI database record associated with it, and the location field(s) of that record would be updated with the patient's expected or confirmed location so that PSAP 40 can query the ALI database 52 using the ANI for the call from the emergency services server 60 to get the patient's location.

As mentioned previously, in certain examples a third party may initiate an emergency services call on behalf of a medical patient or some other person experiencing an emergency. In accordance with such examples, a service provider such as a call center technologist, a physician, a nurse practitioner, etc. may initiate the call. Prior to initiating the call, the third party will update the ALI database record for his or her communication device so that its location fields include location data describing the location of r the person experiencing the emergency using one of the techniques described previously. In addition, the third party will add data to a content-specified ALI database field in the ALI database 52 record having a calling number field value that refers to his or her communication device (e.g., a calling number having the ANI or p-ANI of the communication device). The added data will include information about the nature of the emergency. In certain examples, such information includes at least one of a medical condition, a medical test result, a medical diagnosis, a medical professional, a medical facility, current medications, allergies, prior diagnoses, a type of medical response, a level of care, a direction to a first responder, the address of the person experiencing the emergency, the name of the person experiencing the emergency, a level of ambulance (Advanced Life Support (ALS) or Basic Life Support (BLS)), background information concerning the person experiencing the emergency, and a web address.

In one implementation, illustrated in FIG. 2, the third party will access an emergency patient response website that will include a patient emergency response information web page 80. The patient emergency response information page is a web interface with a variety of fields and descriptors. Field 82*a* is the first name entry field and is proximate a corresponding field descriptor 81*a* which includes alphanumeric characters describing the information to be entered into first name entry field 82*a*. Field 82*b* is a last name entry field and is proximate an alphanumeric characters descriptor 81*b*.

Level of care radio buttons 84 are provided to enter a level of care from among ALS (advanced life support), BLS (basic life support), and other. Entry field 86 corresponds to the other radio button and allows a description of the "other" level of care to be provided. Alphanumeric characters descriptor 83 says "Response required" and is proximate the radio buttons.

Facility type radio buttons 88 each describe a type of facility to which a patient may be transported and are proximate alphanumeric characters descriptor 87. Pre-configured facility types include ED (Emergency Department), Urgent Care, Behavioral Health Center, Cardiac Center, and Stroke Center. An "other" radio button and corresponding entry field 89*a* are also provided and provide the ability to add facility types other than those that are pre-configured.

Facility name entry field 89*b* may be used to enter the name of a specific facility. A selection box 91 allows a user to indicate that a specific facility name will be entered in facility name entry field 89*b*.

A service provider (e.g., a physician, psychologist, psychiatrist, social worker) name entry field 90 is provided along with a proximate alphanumeric characters descriptor 83 and allows the provider to enter his or her name. A provide phone number entry field 92 allows the provider to enter his or her phone number and is also proximate alphanumeric characters descriptor 95.

Manual edit field 94 is automatically populated with the contents of the patient first name entry field 82*a*, patient last name entry field 82*b*, provider name entry field 90, provider telephone number entry field 92, level of care selection 84, and facility radio button selection 88. The user can then edit the alphanumeric characters string in manual edit field 94 to generate the contents of the final caller name alphanumeric characters field 96 to be sent to the ALI database 52. Alphanumeric characters descriptor 97 is proximate to and describes the manual entry edit field 94. Alphanumeric characters descriptor 99 is proximate to and describes the final caller name alphanumeric characters string 96 to be sent to the ALI database 52. A pop-up warning message 98 is also provided indicating that the number of characters in the final caller name alphanumeric characters string 96 exceeds the maximum number that may be used and that any characters in excess of the maximum number will be truncated. Save button 100 allows the contents of the patient emergency response information page 80 to be saved locally and/or to emergency services server 60 or some form of storage operatively connected thereto.

Figure 3:
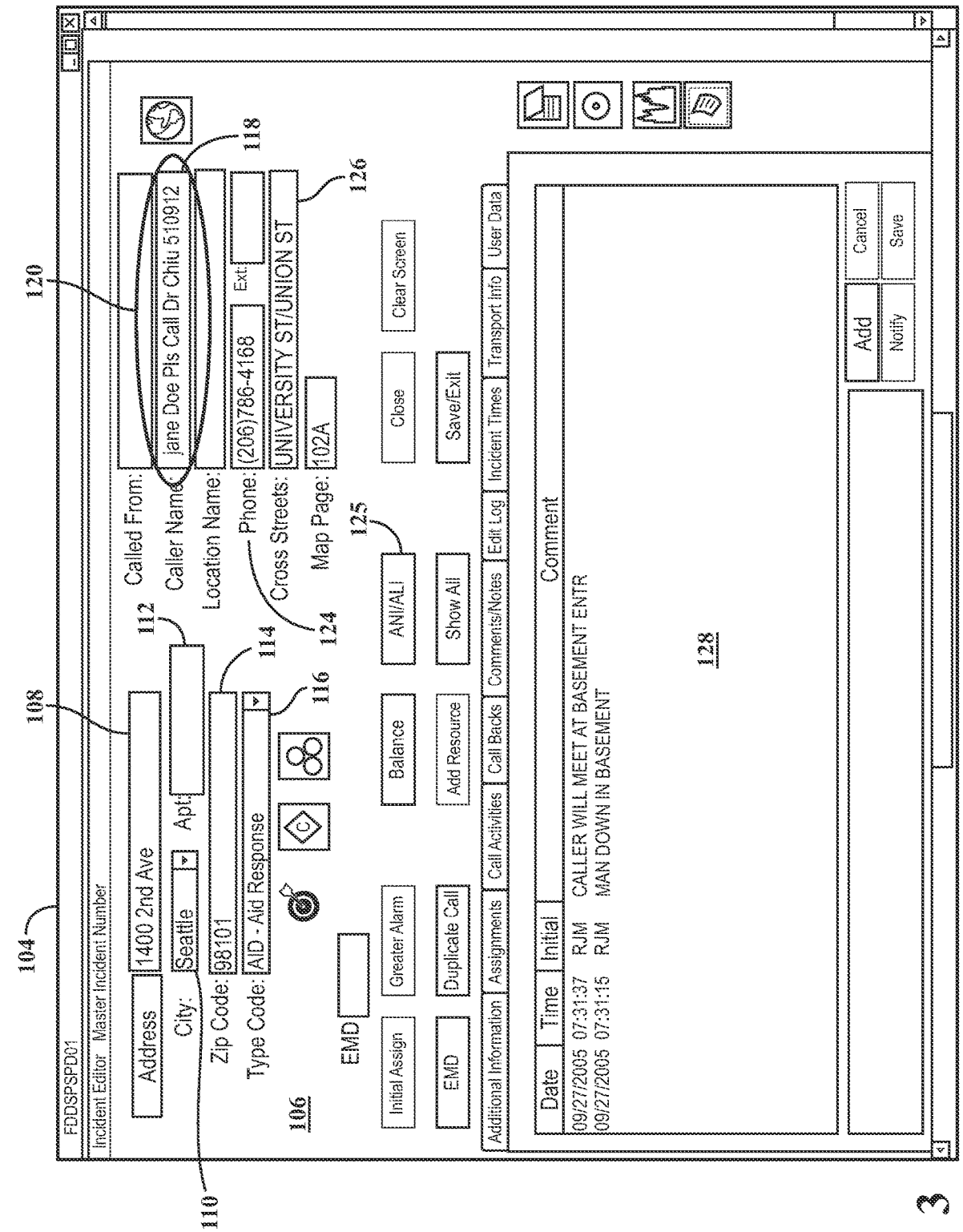
FIG. 3 is a depiction of a computer-generated interface from a 911 PSAP legacy terminal in accordance with the method of FIG. 2.

After saving patient emergency response information page 80, the third party initiates an emergency services call using communication device 36, 56, 58 (FIG. 1). After receiving it on PSAP terminal 44, the PSAP operator uses the ANI (landline/VoIP) or p-ANI (wireless) to query the ALI database 52 and obtain the caller name and caller address. Referring to FIG. 3, terminal interface 104 displayed on PSAP terminal 44 is shown. Terminal interface 104 has an address section 106 that shows the contents of several location fields in the ALI database record for the communication device 36, 56, 58. Address section 106 includes a street address display field 108, a city display field 110, an apartment number display field 112, and a zip code display field 114, all of which are used herein to describe the location of the person having the emergency, not the location of the third party and his or her communication device 36, 56, 58. Calling number display field 124 shows the calling number field for the communication device 36, 56, 58, which enables the PSAP operator to call back if a call is dropped. Field 126 shows cross-streets for the location defined by the address section 106. Button 125 is selectable to query the ALI database 52 and the ANI of the call.

Caller name display field 118 displays the contents of the caller name field from the ALI database record for the communication device 36, 56, 58. Thus, as shown in FIG. 3, in a case where the third party (e.g., treating physician) generated the alphanumeric characters string shown in final caller name alphanumeric characters string 96 of FIG. 2, caller name display field 118 would show "Jane Doe Pls Call Dr Chiu 5109123636 ALS CardiacCe" (only a portion of the alphanumeric characters string is shown in FIG. 3 for ease of viewing). Comment entry section 128 allows the PSAP operator to enter alphanumeric characters that are conveyed to first responders handling the emergency services call.

Figure 6:
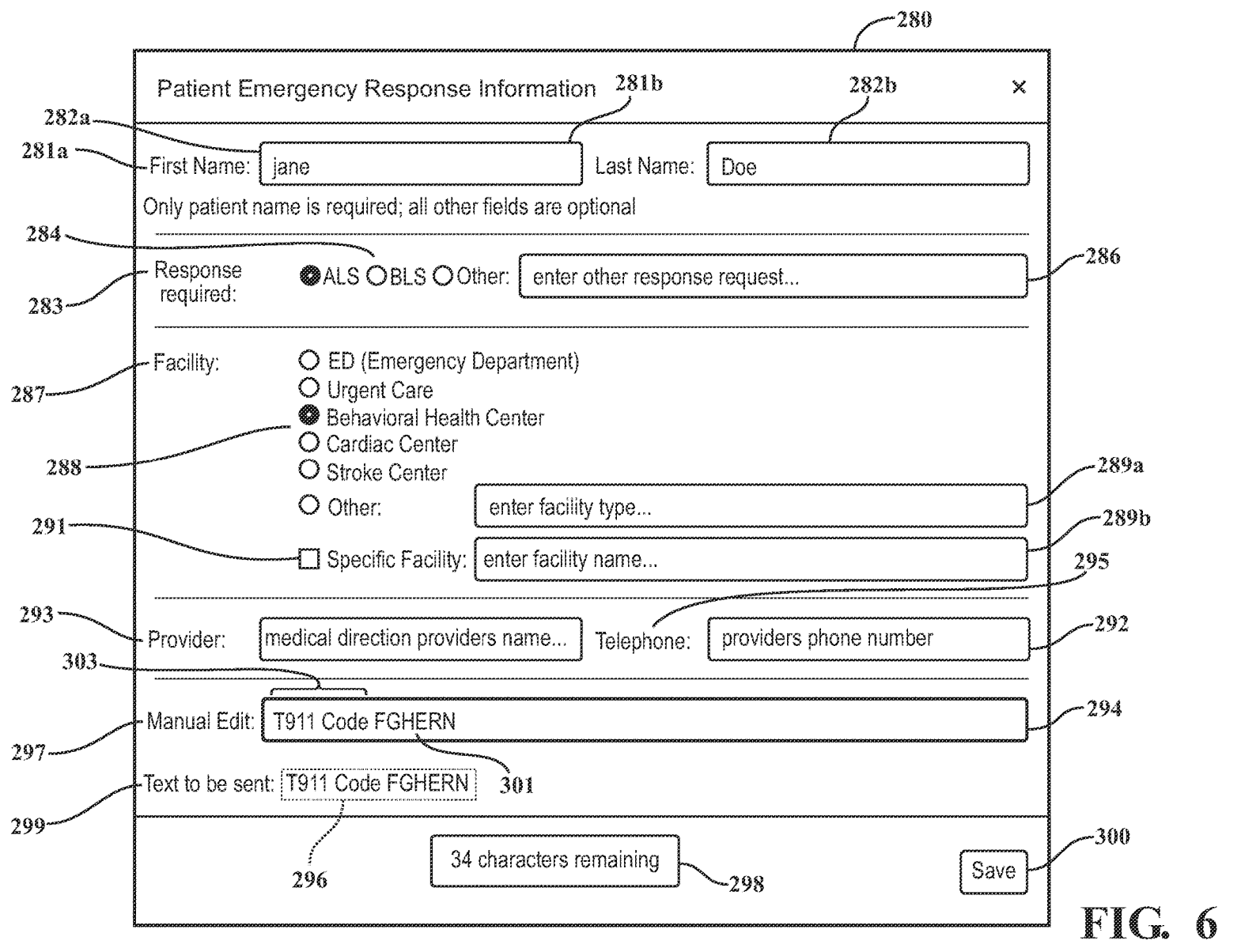
Figure 7:
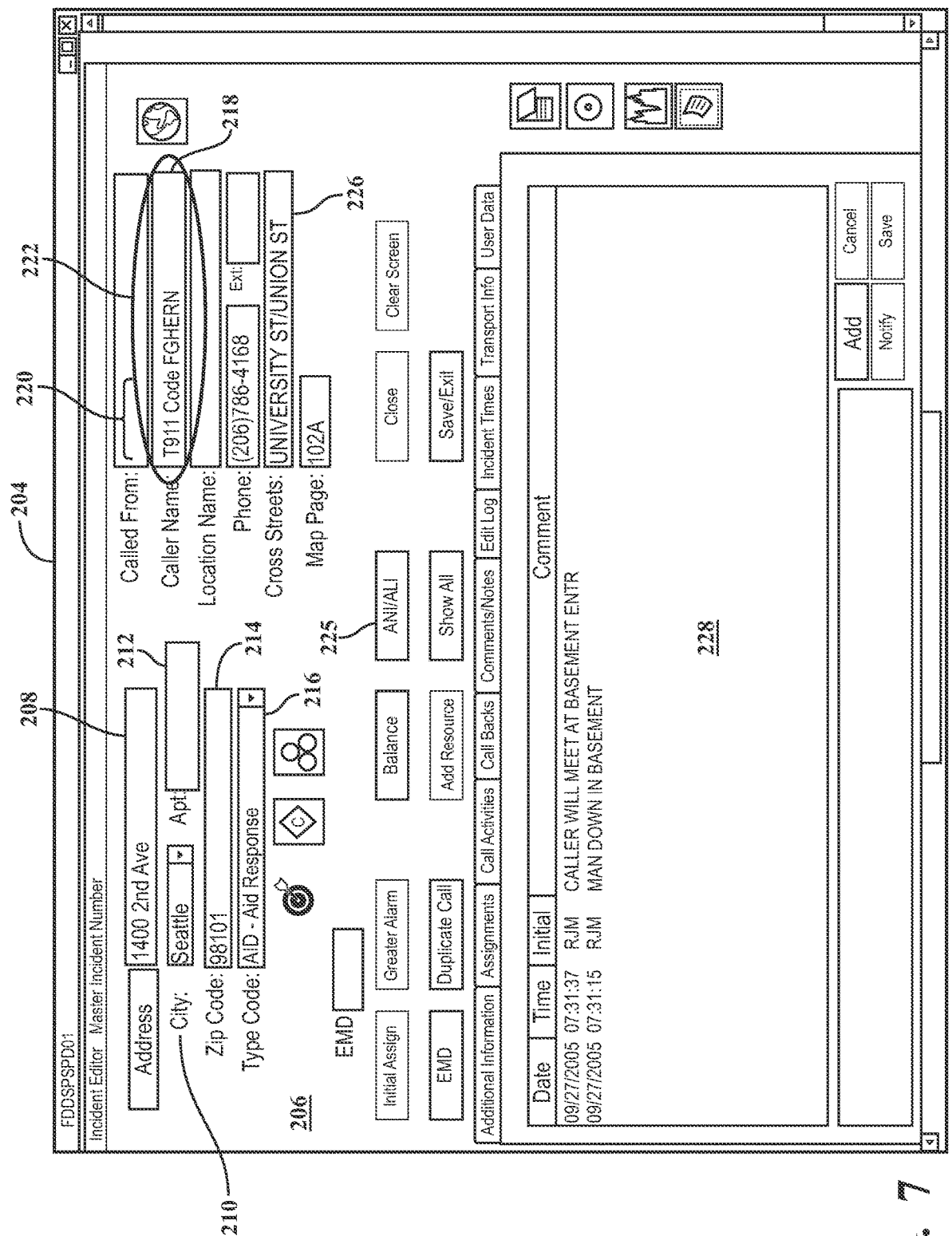
FIG. 7 is a depiction of the 911 legacy PSAP terminal, computer-generated interface of FIG. 3 in accordance with the second example of a method for providing emergency services.

As mentioned previously, in certain implementations, an ALI database caller name alphanumeric characters field is hacked or manipulated to include an alphanumeric emergency job code giving access to vast information about the emergency. An example of this implementation is illustrated in FIGS. 6 and 7. Note that in FIG. 6, the second and third digits of the reference numerals correspond to the reference numerals in FIG. 2 and have the same meaning. The reference numerals with "2" as the first digit in FIG. 7 have the same meaning have the same meaning as those bearing a "1" as their first digit in FIG. 3.

In cases where the available ALI database content-specified text field or the corresponding display on the PSAP terminal does not have enough characters to accommodate the information that is desired to send to the PSAP, the information may be encoded in "job code" that is instead entered into the content-specified text field. Referring to FIG. 6, another example of a patient emergency response information web page 280 is shown. Initially, manual edit field 294 is automatically populated with the contents of the patient first name entry field 282a, patient last name entry field 282b, provider name entry field 290, provider telephone number entry field 292, level of care selection 284, and facility radio button selection 288. In this example, the physician or other person reporting an emergency overrides the default entries in manual edit field 294 by entering an alphanumeric emergency job code 301 ("FGHERN") into manual edit field 294. Alphanumeric characters type indicator 303 ("T911 Code") is also entered into manual edit field 294 to indicate that the characters comprising alphanumeric emergency job code 301 should be understood as a code that needs to be decoded, for example, by accessing a website that links a series of job file web pages containing information about the emergency to the alphanumeric emergency job code 301. Thus, in FIG. 6, the alphanumeric characters type indicator "T911 Code" is used to indicate that the alphanumeric characters FGHERN are an alphanumeric emergency job code 301. The contents of the manual entry field 294 are automatically entered into the caller name transmission field 296. Save button 300 is pressed to transmit the contents of the caller name transmission field 296 to the emergency services server 60 and update the ALI database record for the physician's communication device 36 or whatever communication device is used to place the emergency services call for the person or property experiencing an emergency.

Figure 4:
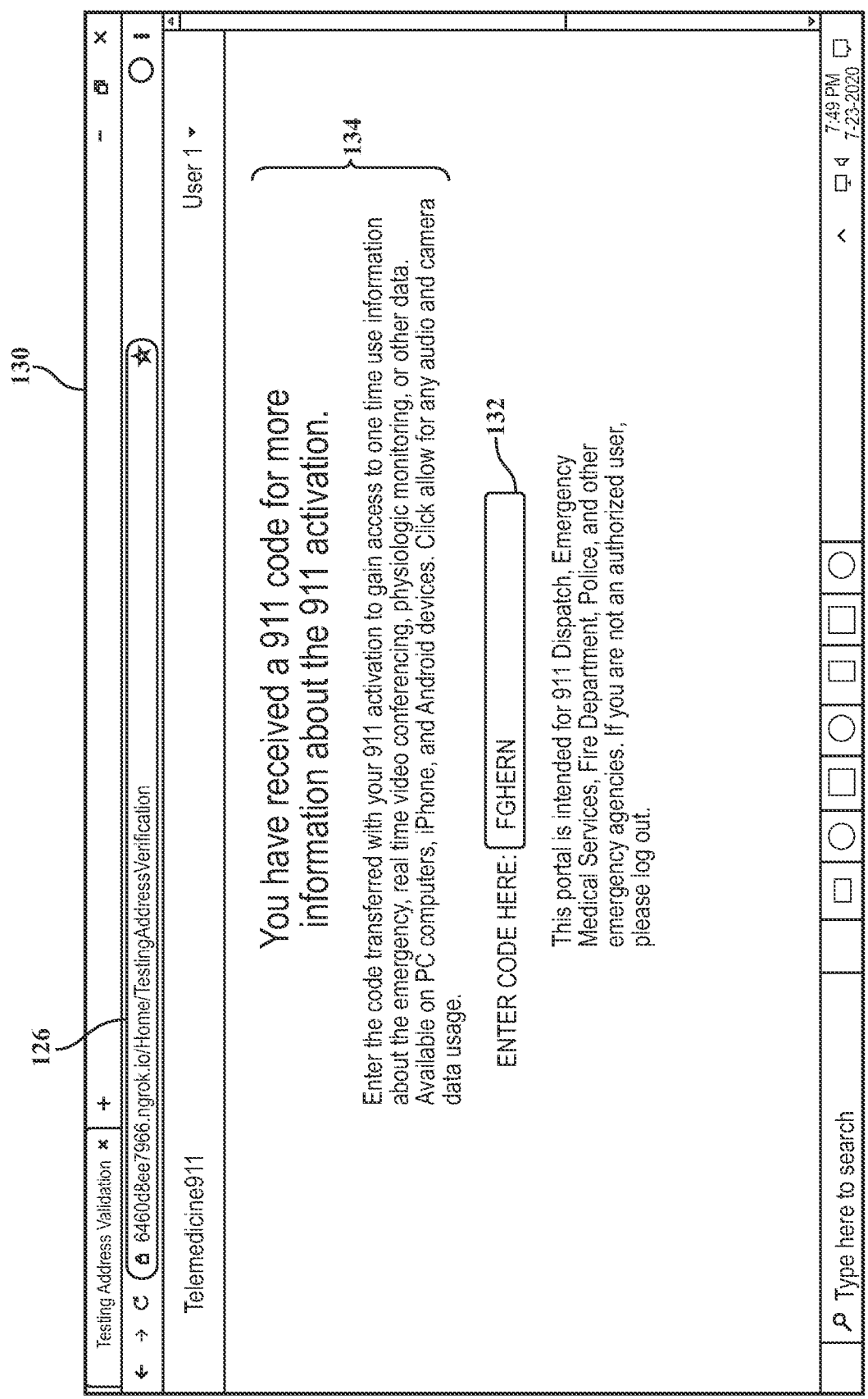
FIG. 4 is a web page from an emergency services job file website used to access alphanumeric characters, graphical, and video information about an emergency.

After the emergency services number is entered into whatever communication device is used, the call is routed to the PSAP 40 responsible for the jurisdiction in which the patient (or whatever person or property is experiencing an emergency) is located. FIG. 7 shows an example of the PSAP terminal 44 interface 204 corresponding to FIG. 6. Caller name display field 218 includes the contents of manual entry field 294 and caller name alphanumeric characters transmission field 296 of FIG. 6. In this case, those contents are alphanumeric characters type indicator 220 ("T911 Code") and the alphanumeric emergency job code 222 ("FGHERN"). In the example of FIGS. 6 and 7, the PSAP operator preferably uses a web browser on an Internet-connected computer (separate from terminal 44) to access a website that "decodes" the alphanumeric emergency job code 301. Referring to FIG. 4, a landing page 130 for an emergency services job website accessed by entering a predetermined web address 129 into a web browser is shown. Descriptive alphanumeric characters 134 inform the user that the accessed website is used to provide more information about the emergency related to the 911 call with which the alphanumeric emergency job code 122 is associated. The PSAP operator enters the alphanumeric emergency job code 222 from FIG. 7 into alphanumeric emergency job code entry box 132 on landing page 130, causing a set of web pages ("job file web pages") FIGS. 5A-5D describing the emergency to be accessible. The alphanumeric emergency job code 222 identifies a specific "job" for which emergency services are to be provided as defined by the information saved in the patient emergency response information form 80 of FIG. 2 on a given date and time.

Many web page configurations and layouts are possible for accessing information linked to a particular alphanumeric emergency job code, and the job file web pages depicted herein are merely exemplary. Referring to FIG. 5A a medical professional and patient information web page 133 comprising all or a portion of the set of job file web pages is displayed. The medical professional and patient information web page 133 includes a photograph 135 of the medical professional whose name was entered into provider name entry field 90 in FIG. 2. Medical professional credential section 136 also displays the medical professional's (provider's) credentials including information selected from the group consisting of at least the states he or she is licensed in, his or her national provider identification (NPI) number, DEA number, controlled dangerous substance (CDS) number, license numbers and certifications. The medical professional information helps ensure that first responders are taking medical direction from someone qualified to provide it. The patient section 137 shows a photograph of the patient (person experiencing the emergency), patient name 140, patient age (144), Date of Birth 142, chief medical complaint 146, and medical problems 148.

Figure 5B:
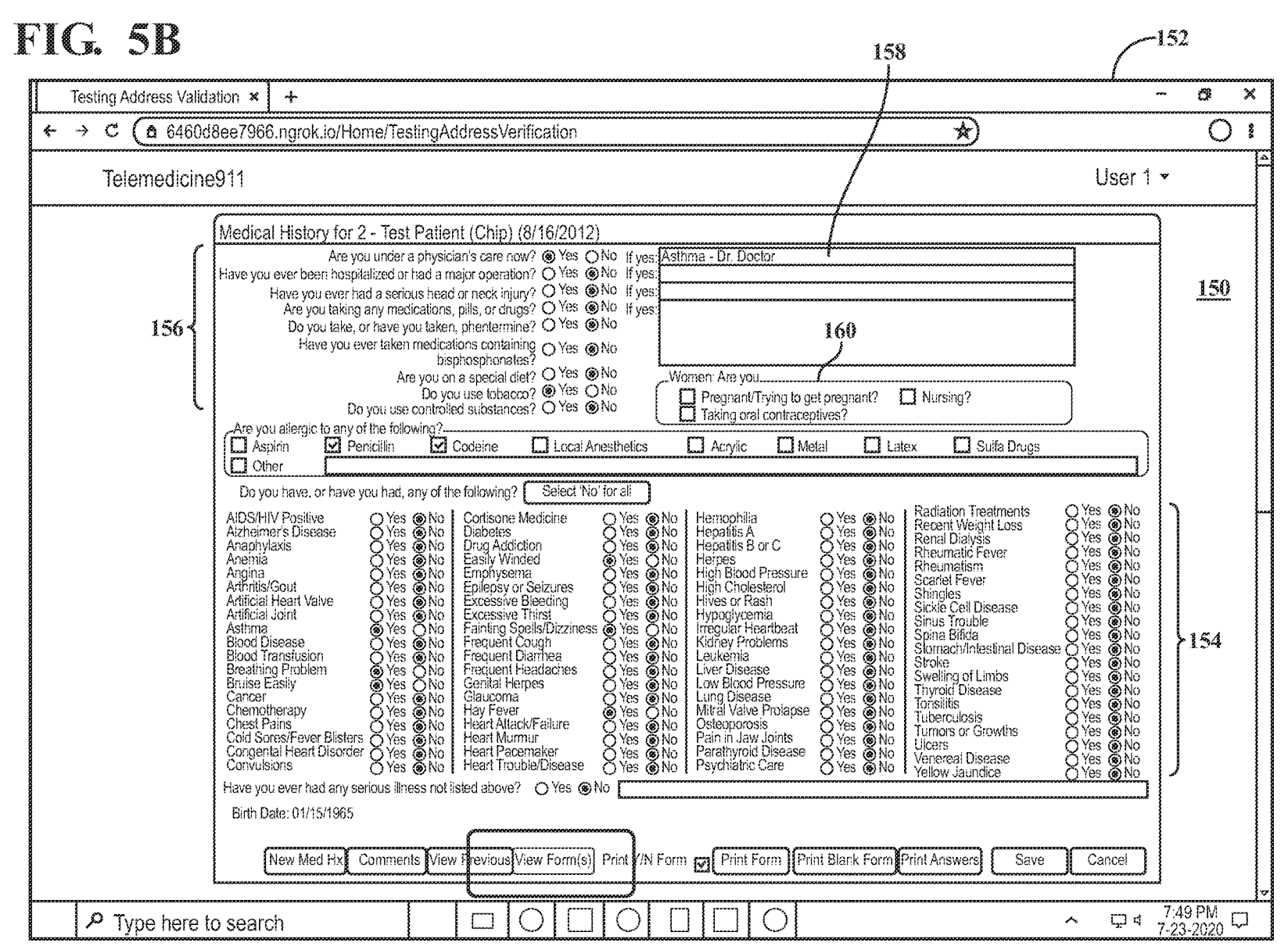

Referring to FIG. 5B, a patient's medical records page 150 is shown and comprises one of the job file web pages corresponding to alphanumeric emergency job code FGHERN. In certain examples, the patient information is dynamically linked to an electronic medical records (EMR) database to populate the various fields on web page 150. Upper half 152 includes section 156 which provides includes answers to a first set of yes/no medical questions. Additional information entry box 158 provides explanatory alphanumeric characters concerning the answers to the yes/no questions. Lower half 154 of the medical records page 150 includes yes/no answers to whether the patient has had various medical conditions. Of course, additional medical records pages, including those with different medical information, may be provided for a given job, and page 150 is merely exemplary.

Figure 5C:
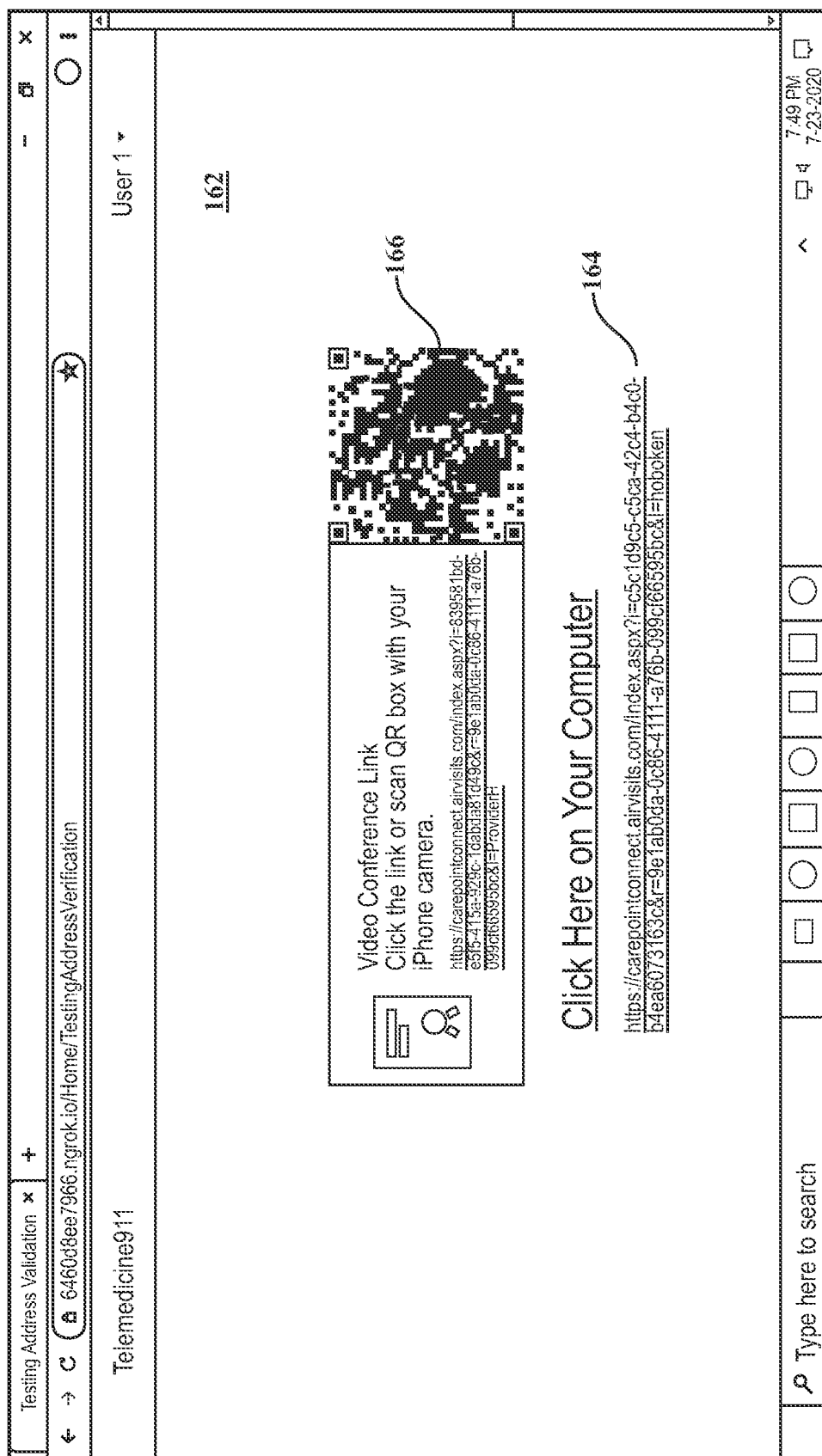
FIG. 5C is a webpage from the website of FIG. 4 having a weblink and a QR code used to launch a videoconference between individuals collaborating on an emergency event who are remote from one another.

As shown in FIG. 5C, in one example, the job file web pages created for a given job also include a web page with a video conference link that allows those provided with alphanumeric emergency job code 122 to communicate with one another via video conference. One such example is video conference link page 162. Video conference link page 162 includes a hyper link 164 that is selectable to launch an instance of a videoconference. A QR code box 166 is also provided which allows users with a smartphone camera to scan the QR code to launch an instance of a videoconference on the smartphone. In one example, the link 165 and QR code are created using Web RTC methods to create a link for one-time use.

Figure 5D:
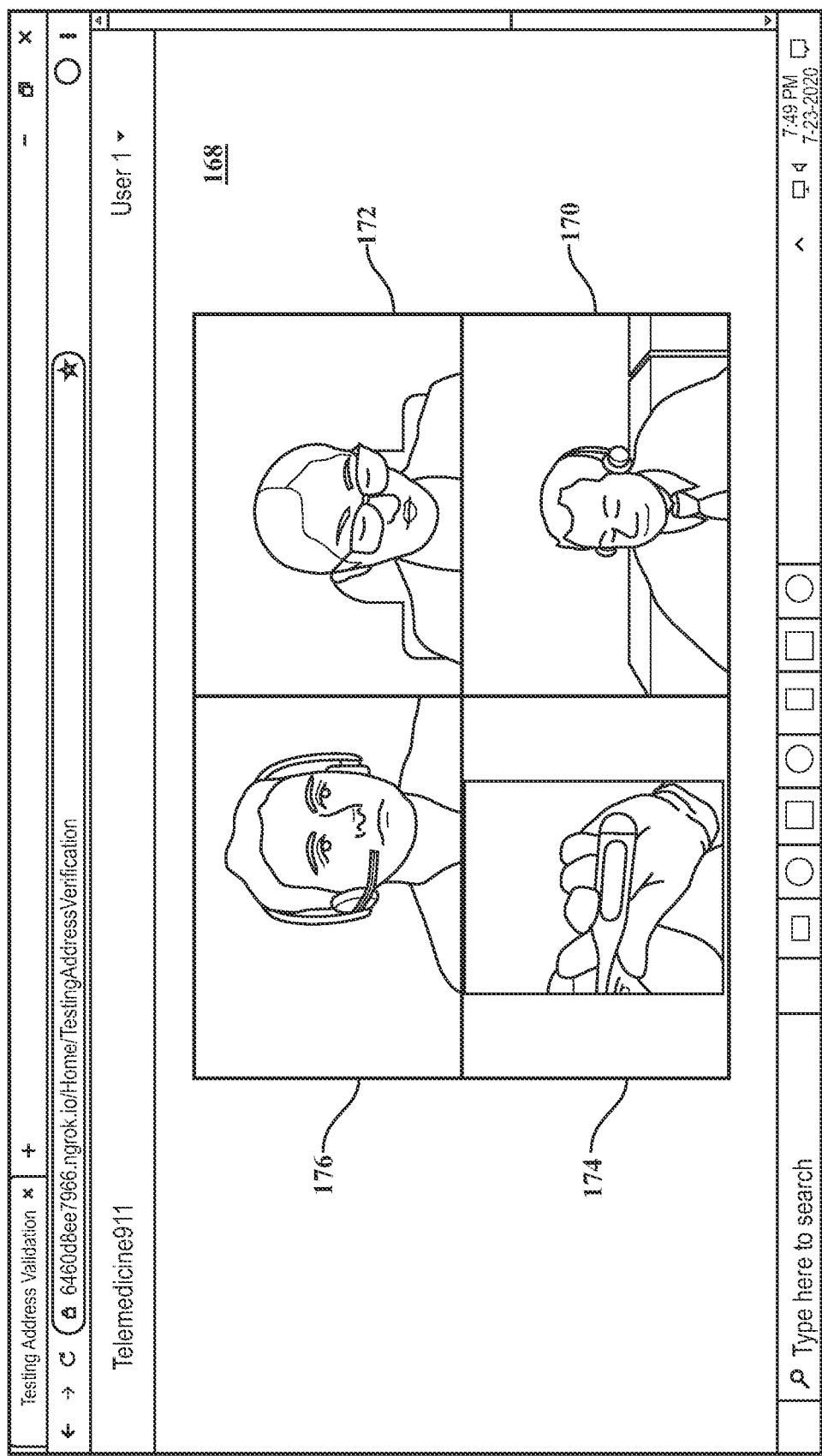
FIG. 5D is a webpage from the website of FIG. 4 displaying a videoconference.

A videoconference display page 168 is shown in FIG. 5D and is launched as just described. In the example of FIG. 5D, four videoconference participant display regions 170, 172, 174, and 176 are shown each of which displays a video feed for a respective videoconference participant. In the depicted example, a nurse practitioner 172, physician 170, attending EMT 174 (who is present with the patient), and a scribe 176 are shown.

One of the main problems with emergency services calls is that downstream personnel (e.g., first responders, attending physicians, treatment facility personnel) often know little about the patient (or other person experiencing an emergency). Conversely, when there is an emergency, the patient's primary doctor, full care team, and other important people often do not know anything about the emergency. Both groups of professionals have very valuable information that the other should know. The systems and method described herein connect these two groups by providing selective access to information about the emergency via the job code website (such as the one shown in FIGS. 5A-5E) and the alphanumeric emergency job code 222. The result is better, faster, more tailored care with all the current advances in technology without the infrastructure changes required to support NG911.

Figure 5E:
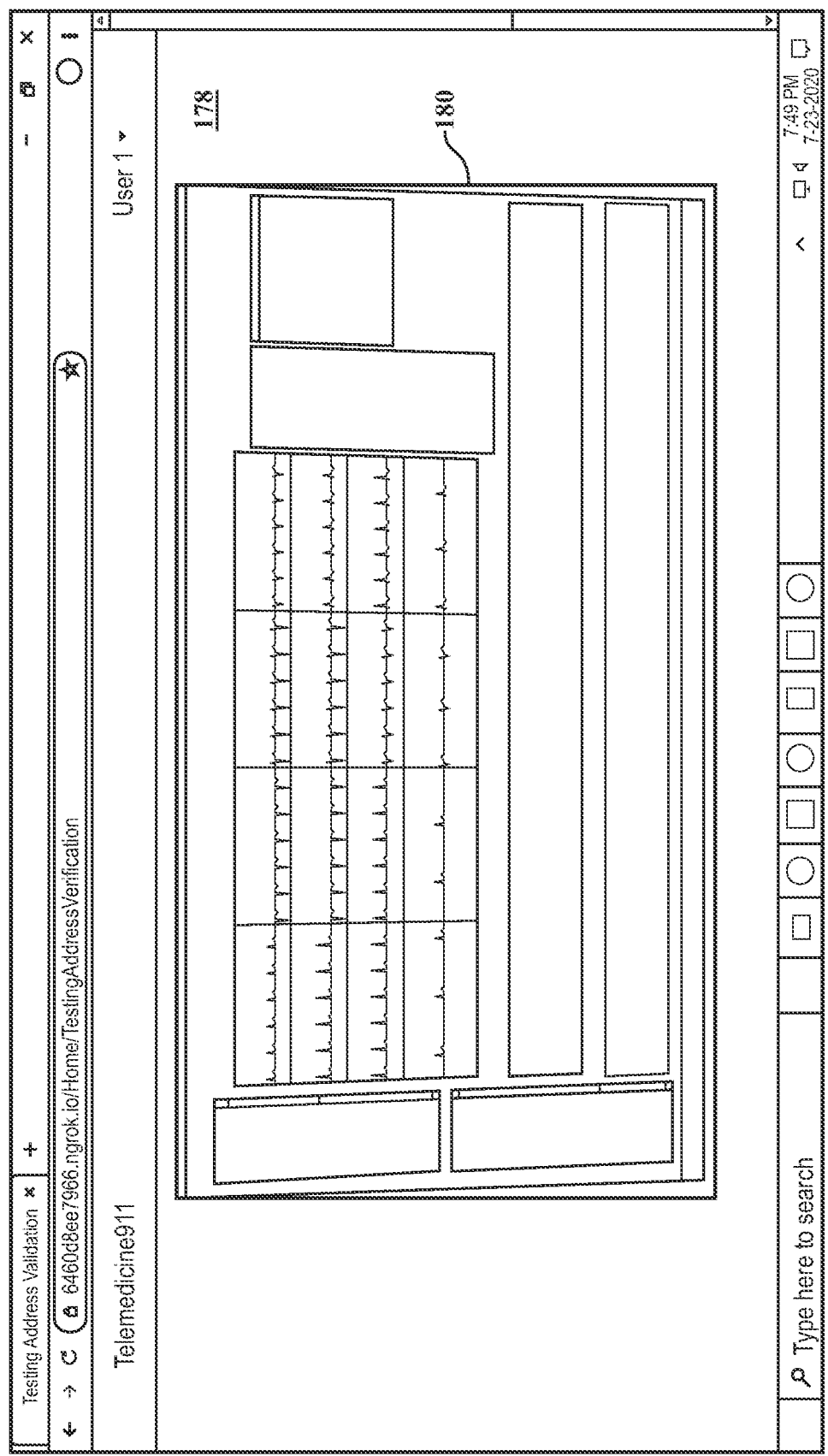
FIG. 5E is a webpage from the website of FIG. 5D displaying real time medical physiologic data for a patient.

In certain examples, and as illustrated in FIG. 5E, the patient may be monitored with a real time, medical physiologic data monitor, and the resulting data may be transmitted in real time to a webpage comprising part of the job file webpages that are accessible with the same alphanumeric emergency job code. In FIG. 5E real-time EKG monitoring is used. Real-time monitoring web page 178 includes graphical EKG display 180 which provides real-time EKG data for the patient.

In other examples, a PSAP operator may handoff (transfer) a call to downstream medical providers, for example telemedicine providers. In accordance with such examples, a plurality of medical provider groups are part of a centralized medical provider organization which will be responsible for selecting an appropriate group to provide medical services to the patient. The PSAP operator will enter a group code that encodes desired characteristics of the downstream medical provider into an interface displayed on a PC, and a server operatively connected to the PC will update the job file web pages include the group code. When the emergency services call is then transferred to the centralized medical provider organization, the provider will receive a link to display the job file web pages associated with the call, and can use the received group code to select an appropriate medical provider group.

In another exemplary implementation of the systems and methods described herein, the PSAP operator hands off an emergency services call to a telemedicine doctor who realizes that the PSAP's conclusion that the situation is not emergent is incorrect. In this case, the job file web pages would be updated by the PSAP operator to include identifying information for the PSAP operator. The doctor can use that identifying information to handoff the call back to the same dispatcher to maintain continuity of care.

In a further scenario, there are spikes in emergencies which need to be transferred from a PSAP to telemedicine doctors, and there are not enough telemedicine doctors to handle the volume. Text information about the emergency can be culled into a receiving forum of telemedicine providers where deidentified information about the patient emergency can be displayed and doctors can claim the case.

In another example, for a given emergency, the topics of the content delivered during a handoff between emergency services personnel are stored in association with the methods used to deliver the content and/or the forms that the content takes and correlated to specified emergency services outcomes. The handoffs may be between an emergency services provider and a PSAP operator, between a PSAP operator and a medical services provider, or between a PSAP and a first responder, to name a few examples. The correlations are then used, such as by comparing correlation coefficients, to determine the statistically superior method of content delivery and/or form of content for the associated content topic. In this way, standardized deliverable content may be developed and may be dynamically adjusted based on the extent to which delivering the content in a particular form and/or by a particular method achieves a desired emergency services outcome.

In certain examples, the set of standardized deliverable content contains at least one selected from written content, orally-delivered content, audio recordings of orally-delivered content, pictures, video, and physiologic tracings. "Written content" in this context means content that is delivered to the handoff recipient in writing. "Orally-delivered content" is delivered orally but may be reduced to a written script to be read by the party making the handoff.

"Emergency services outcomes" are specified outcomes during the course of an emergency. Examples include the occurrence of specified delays in providing care, whether the patient arrived at an appropriate destination facility, whether an appropriate level and type of first responder arrived on site, whether the patient died, whether first responders were assaulted, and whether assault on first responders, whether first responders arrived with appropriate personal protective equipment (PPE), whether first responders contracted a particular illness during the emergency, and the occurrence of specified delays in forced entry, For any given method or form of delivery of a piece of content, whether a particular emergency outcome was observed may be correlated to whether the method/form of content delivery was used to see the extent to which the method/form of content impacted the outcome. Correlation coefficient thresholds may be set to determine whether a particular method/form of content should be used. In preferred embodiments, as emergencies occur, whether any method/form of content was actually delivered is logged along with whether any particular emergency services outcome occurred. The data is the scanned to isolate emergencies in which a particular method/form of content delivery was varied while other methods/forms of content delivery remained constant so that the effects of other methods/forms of content may be filtered out.

In one example, the topics of the content delivered by a hacked ALI database text field or job file web pages and the methods used to deliver that content (or the specific forms of the content) are stored in a database which may be operatively connected to emergency services server 60 or another server within server farm 61. Using computer executable instructions which, when executed by a computer processer, perform known statistical correlation algorithms, correlations between the usage of stored methods of content delivery or forms of content for the various content topics may be correlated to the occurrence of emergency service delivery outcomes to develop best practices for the methods and/or forms of delivering the various content topics.

For example, patient location may be a content topic, and it may be delivered from emergency services personnel—such as a telemedicine doctor treating the patient or a call center technologist—to a PSAP operator. The location information may be provided in the form of written street addresses or written longitude and latitude coordinates. The emergency services outcome of interest could be defined as whether first responders initially arrived at the correct scene, or the measured delay in arrival time caused by responding to an inaccurate address. The emergency services outcomes may also include whether the patient survived. So, in the case of patient location, the use of written longitude/latitude versus a written street address may be correlated to one or more of these outcomes, and the correlation coefficients may be used to determine which method or form of content delivery is most effective. The determination of the statistically best method of delivery or form of content then could be used to update standardized methods of content delivery or forms of content for the associated content topic.

As mentioned above, certain methods/forms of content delivery may be provided in set of standardized deliverable content, which includes standardized scripts for emergency services providers to read to PSAP operators, for PSAP operators to read to first responders, or for first responders to read to downstream medical facilities. For example, one content topic may be agitated patients. The form of delivery may be a written message in the job file web pages indicating whether the patient is agitated. The emergency services outcome to which the delivery of this information is correlated could be whether an assault on first responders took place. For a variety of emergencies involving agitated patients, the usage of the two options of providing or not-providing an oral message indicating the patient is agitated are correlated to whether first responders were assaulted during the emergency. As another option, providing a written message and providing an oral message to the recipient of the patient hand-off may be correlated to that same outcome. Based on the results of the correlation, the standardized scripts used during the handoff may be modified to reflect the statistically most successful method of content delivery or form of content.

In another example, the content topic could be patients with HIV. The form of the content would be whether an oral communication to the recipient of the handoff is provided indicating whether the patient has HIV or whether that communication is not provided. Those two options may be used in various emergencies and then data indicating which option was used would be stored in association with data reflecting an emergency services outcome of interest, for example, whether a first responder was stuck with a needle and/or ultimately contracted HIV.

In a further example, involving police emergencies, oral communications from emergency services personnel (such as a treating physician or call center technologist) to a PSAP operator regarding the state of safety at the scene may be correlated to the emergency services outcome of whether police arrived at the scene with EMS. The conversation may be recorded by the communication device and transmitted to the emergency services server 60 (or another server) and digitized for comparison to reference statements so a flag (ON/OFF) can be set indicating if a particular communication was used or not. In an additional example, oral communications regarding whether weapons are on site may be correlated to the emergency services outcome of whether emergency services personnel were hurt at the scene. In additional examples, COVID 19 status of a patient may be provided in the form of an oral communication from an emergency services provider to a PSAP operator and data describing whether such oral communications were provided may be correlated to whether first responders used personal protective equipment (PPE), whether first responders were exposed to COVID 19, and/or whether they contracted COVID 19. Also, the content methods of delivery and/or forms of the content may be correlated separately for the different backgrounds of users who may be making a handoff. The content delivered by a doctor could be different than the content delivered by a layman. The correlation could be further refined based on specific user characteristics stored in user profiles in a database, such as the education, age, ethnicity, languages spoken, geographic residence, experience and/or licensure of the user making the handoff. In this way, the present disclosure provides a smart content delivery system for delivering content related to providing emergency services to a patient in which the system is self-learning and automatically updates the methods and/or forms of communication of various content topics based on the statistical correlations between selected emergency services outcomes and those methods of content delivery or forms of content.

An exemplary excerpt from a database used to generate correlations between the delivery of a particular form of content or method of delivering the content and the occurrence of a particular emergency services outcome is shown it Table 1 (below):

TABLE 1

| Content Topic | Content Delivered to PSAP Operator | Actual Emergency Services Outcome | Number of Emergencies in Sample | Correlation Coefficient | Active/Inactive Status Flag for Content in Set of Standardized Deliverable Content |
|---|---|---|---|---|---|
| First Responder Safety | 00321 "Safety concerns for first responders are [weapons on site, patient agitation, no capacity to make decisions, environment safety concerns, or NONE]." | Whether first responder(s) was assaulted | 3763 | 0.002 | Active |
| | | Whether police arrived onsite with first responder | 109287 | 0.74 | Active |
| Patient Location | 00123 "I have asked the patient to wait outside" (preferred) or "the patient is in (on)" [state location detail: rear bedroom floor, 4th floor apartment, office bathroom, sidewalk, front stairwell] | Whether patient was waiting outside When first responders arrived | 38920 | 0.68 | Active |
| | | Total emergency response time is less than 12 minutes | 39303 | 0.82 | Active |

The format of Table 1 is merely illustrative, and a variety of different database formats may be used. The content topic is provided in the first column. Within each content topic, there are one or more sub-rows for "Content Delivered to PSAP Operator." The contents of column 2 are actual statements made to a PSAP operator (or to whomever receives a handoff). Thus, the appearance of content in the second column indicates not only the text of a statement but a recordation that it was delivered to a hand/off recipient. In that sense, the contents of column 2 represent a binary state of delivery ("delivered" as opposed to "not delivered") of the content. In the third column, the occurrence of specified emergency outcomes is provided. In the case of Table 1, the data in column 3 indicates that a specified outcome actually occurred. In that sense, the contents of the third column represent a binary state of occurrence ("occurred" as opposed to "did not occur"). Alternatively, Table 1 could be structured so that there are separate columns for the binary states of the content delivered to the PSAP operator and the text of the content. The emergency services outcome data could be structured similarly. Note that for each content method of delivery of form of content in column 2, there can be multiple emergency services outcomes, which is the case in Table 1 in which there are two emergency services outcomes associated wit method of delivery/form of content in column 2. Column 3 shows the sample size, i.e., number of emergencies, used to correlate the usage of the method/form of content delivery in column 2 with a particular emergency services outcome. Column 4 shows the correlation coefficients for each correlation, and Column 5 shows the status of each method of delivery/form of content in column 2 within a standardized set of deliverable content. "Active" means that the method of delivery/form of content is in active use in the standardized set of deliverable content. "Inactive" means that it is not.

As discussed previously, the correlation coefficients quantify the impact of using a particular method of content delivery or particular form of the content on a specific desired emergency services outcome. For example, the data in the second row of Table 1 indicates that delivering a particular statement in column 2 about the safety concerns at a scent, correlates to the whether the police arrived with first responders at a correlation coefficient of 0.74, whereas delivering the same content did not correlate well with whether first responders were assaulted, which means had little impact on a desired emergency services outcome.

The correlation coefficients are evaluated for various outcomes to determine whether a particular method of delivery/form of content should be removed from a standardized set of deliverable content. Table 2 illustrates this process:

TABLE 2

| Method of delivery/form of content | Outcome 1 | Outcome 2 | Outcome 3 | Outcome 4 |
| --- | --- | --- | --- | --- |
| Content 1 | 0.0002 | 0.11000 | 0.00000 | 0.00000 |
| Content 2 | 0.223 | 0.0005 | 0.00000 | 0.00000 |
| Content 3 | 0.00000 | 0.000000 | 0.0095 | 0.0098 |
| Content 4 | 0.00000 | 0.000000 | 0.00000 | 0.00000 |

A shown in Table 2, any individual specific piece of content in the first column, may correlate differently with various emergency services outcomes corresponding to the 2 through $4^{th}$ columns. In certain examples, if the piece of content exceeds a certain correlation coefficient for any desired emergency services outcome, it is retained in the standardized set of deliverable content. Otherwise, it is removed. As mentioned above, in preferred embodiments, correlations are generated by looking at outcomes for which only one variable changes, i.e., where with respect to a particular outcome, only the delivery of only one piece of content varied. The scanning process is preferably automated using known scanning algorithms. Correlation coefficients may be calculated by known techniques, one example of which is the Pearson-product-moment correlation known to those skilled in the art. In preferred examples, specific content is not removed from the standardized set of deliverable content unless the sample size used to generate the correlations is considered statistically significant such as by using a p-value threshold of less than 0.05 along with using a correlation coefficient threshold.

Referring to FIG. 1, to facilitate the creation and use of real-time monitoring web pages such as web page 178, in system 20 one or more physiological data devices 30 are provided which detect physiological data for a patient and transmit the data to a patient communication device 32 via either wireless or wired connections. The "patient communication device 32" may belong to a first responder or some other person physically present with the patient. Communication device 32 then transmits the physiological data to a web server (which may be emergency services server 60) which is accessed via a webpage such as real-time monitoring web page 178. A variety of known physiological data devices 30 may be used to measure physiological data such as ECG data, implantable cardioverter defibrillator data, blood vessel impedance data, intra-cardiac pressure sensor data, ultrasound data, intracranial pressure sensor data, pulse oximetry data, co-oximeter sensor data, light absorbance data, glucometer data, EEG data, and endovascular graph sensor data, to name a few. Suitable physiological data devices 30 configured to transmit data to communication device 32 include those supplied by Card Guard Scientific Survival, Ltd., of Rehovot, Israel and QRS Diagnostic of Maple Grove, Minnesota. Other suppliers of such physiological data devices include Nasiff Associates, Inc. of Central Square, New York and Pulse Biomedical, Inc. of Norristown, Pennsylvania. For wireless implementations, the physiological data devices 30 will preferably include a wireless transmitter configured to wirelessly transmit data to patient communication device 32. Wireless communications between physiological data devices 30 and patient communication device 32 may be provided using various protocols and other wireless technologies, including 3G and 4G wireless technologies and the IEEE series of wireless technologies. More particularly, wireless communications may take place over a CDMA, EDGE, EV-DO, GPRS, GSM, UMTS, W-CDMA, or a 1Xrtt network as well as an IEEE 802.11 (WiFi), 802.15 (Bluetooth and Zigbee), 802.16 (WiMax) or 802.20 (MBWA) network.

Patient communication device 32 acts as a gateway to computer network 34. Suitable communication devices 32 will be capable of wirelessly communicating with one or more internet servers, in particular, emergency services server 60, located in emergency services server farm 61. Suitable communication devices 32 include wireless transmitters and include cellular telephones, smart phones, tablet computers, laptop computers, desktop computers with wireless modems, etc.

In cases where wireless transmission between patient communication device 32 and computer network 34 cannot be achieved or is transient—such as in the case of the patient living in the basement or out of wireless range—an additional device, such as a wireless router, can be integrated to send the data via wired transmission to internet cloud 34. One such exemplary router is the GAC 150 WiFi dial up router supplied by Great Arbor Communications of Potomac, Maryland. In such cases, the patient plugs the router into a phone jack or an existing Ethernet port. When the reception is weak the patient communication device will switch to WiFi and look for the router signal. If the router is connected to an Ethernet port, it will transfer the data through the patient's own wired internet connection (e.g., home broadband cable or DSL connection). If the router is connected to the phone line, when the router senses a WiFi connection from the phone, it automatically dials the "dial up services" to get a 54K dial up connection.

In other cases, a patient may live in a rural area without phone or internet service. In such cases, the patient is provided with a wireless network extender that connects to patient communication device 32 via WiFi and is able to transmit data and voice over satellite. In this scenario, the patient communication device 32 preferably has a direct line of sight to the sky (i.e., a window).

System 20 is useful for a wide variety of emergencies including crimes, natural disasters, fires, and medical emergencies. In each case, a PSAP gets information via alphanumeric characters, video, and/or images which would otherwise have to be conveyed orally. In the medical area, system 20 is particularly useful for patients who must be closely monitored and routinely tested due to a known medical condition, such as cardiac disease, diabetes, etc. The range of medical conditions for which system 20 may be used is not limited. In one implementation, a patient subscribes to use system 20 and is associated with one or more call centers 54 used to monitor the patient's after care following his or her release from a medical facility. System 20 may be used with a wide variety of medical events and is not limited to any particular event or events. Non-limiting examples of such events include acute coronary syndrome, myocardial ischemia, myocardial infarction, cardiac arrhythmia, syncope, congestive heart failure, pulmonary edema, stroke, transient ischemic attack, elevated intracranial pressure, seizure, and carbon monoxide poisoning.

In certain examples, an individual may be provided with a cell phone app or with access to a website that allows him or her to update the caller name field of the ALI database record for his or her phone so that a PSAP receiving the call can dip the ALI database with the ANI or p-ANI of the call and obtain the contents of the caller name field. The caller can use the techniques described herein to provide information to the PSAP via alphanumeric characters, video and/or images. The app or website may also generate an emergency services job code and a set of webpages that include information provided by the caller via the app or website, predetermined information about the caller, or medical, legal, or other records of the caller which may be retrieved from a remote database via the Internet. Where the caller is calling for his or her own emergency, the location field(s) of the calling phone's ALI database record would not have to be updated to another location.

In additional examples, the system 20 uses sockets to open and close admissions with dual verification methods. In other examples, the system 20 pings the PSAP with the number of patients admitted to the PSAP's zone so the PSAP can manage staffing and risk.

In the exemplary methods described above, a third party such as a treating physician or call center operator initiated contact with a PSAP in the patient's geographic location to provide emergency services. However, an alternate emergency sequence would be to have the patient or his or her communication device determine that there is an emergency and contact a doctor who would confirm the emergency. The doctor would then confirm the emergency and hack a content-specified text field in the ALI database record for the doctor's phone to include data describing the content of the content-specified text field and information regarding the nature of the emergency (or a code encoding such information). The doctor would also update his communication device's ALI database record location fields to include data describing the patient's location. The doctor would then call an emergency services number to reach a PSAP responsible for the geographic zone in which the patient is located.

Text hacking uses the telephone as the means of layering complex information onto calls without the sender and receiver needing to have the same technology, and combines both verbal and written handoff. The telephone with ANI/ALI layering is the most widely used communication tool. Health systems is plagued with using proprietary information systems which cannot be shared with other hospitals or providers. Emergency medical responders (EMRs) cannot talk to other EMRs across the country since they all have different formats, legal restrictions, and business restrictions. The universal telephone ANI/ALI cuts through these hospital communication barriers and can deliver complex information regardless of which EMR the hospital systems use. Examples of additional emergency scenarios for which system 20 may be useful include the following:

Example 1

A social worker is talking to a patient over the phone. While on the phone the patient gets in a domestic dispute with her husband and sustains trauma. The social worker accesses a web page that allows her to generate an alphanumeric emergency job code and updates the location field(s) and caller name field for the ALI database record that has her phone number in the calling number field. The location field(s) are updated with the patient's address. The caller name field is updated to include the alphanumeric emergency job code. When the social worker saves the updated location and caller name fields for her phone's ALI database record, she causes a job file to be created for the emergency as well as a set of web pages that identify the social worker and her credentials, the patient, her husband, the patient's address, the patient's medical history, and her husband's medical and criminal histories. The social worker than dials the emergency services number (e.g., 9-1-1). The PSAP responsible for the patient's location receives the call, and dips the ALI database to retrieve the contents of the ALI database record's now updated location field(s) and caller name field. The PSAP operator enters the alphanumeric emergency job code from the caller name field into an emergency services job website on a computer that is separate from the PSAP terminal 44 to access web pages created for the emergency and transmits the code to first responders being dispatched to the scene. The responders receive the code and enter it into the same emergency services job website to access the job file web pages created for the emergency and learn that the husband has a COVID-19 and a history of armed assaults with a gun, and the patient has HIV. Because they are aware of these details about the emergency, EMS arrives with personal protective equipment and Police response is upgraded to higher level police units to match the scenario.

Example 2

A daughter of a woman who is being assaulted by her husband is hiding in a closet. She lives in a rural area with traditional 911 run on copper lines and the "text to 911" feature is not available in her area. The daughter has an app on her smartphone which she can use to hack the caller name field for her cell phone's ALI database record. She places a silent call over LTE with the message "He has an assault gun" in the message. The app causes the message to be added to the caller name field in her phone's ALI database record. When the PSAP receives her call, it dips the ALI database with the p-ANI it received with the call and obtains her current location and the contents of the caller name field on a PSAP terminal. Dispatchers upgrade the response to a higher-level police response.

Example 3

This example involves a coordinated response by multiple agencies: The same daughter of Examples 1 and 2 has a Family Services case open. She was provided by her case worker with an app and web address, either of which can be used to hack the caller name field and activate an emergency services call, and her account is linked to the case worker's social work account. When the daughter uses the app or web site to update the ALI database record for her phone, a set of job file webpages are created on a remote server along with an alphanumeric emergency services job code, and when 911 is entered into her communication device, the code is sent to both the PSAP (in the caller name field) and social services. One of the web pages includes a videoconference activation link. All parties put the alphanumeric emergency job code into a code entry field on am emergency services job website (e.g., "T911code.com"). The parties open up the communications web page and click on the videoconference link to join a three-way video conference while en route to the scene. The case worker explains to first responders that both the mother and father have Hepatitis B, prompting the first responders to take blood precautions. The case worker explains to police while en route that the husband has guns, prompting police to prepare for a higher-level gun altercation. All responding parties have sites open on the emergency services job website which also tracks their location. The police notice that EMS will arrive before they will, prompting the police to ask EMS to hold back until they arrive. The case worker clicks on the medical history of the daughter and opens up communications with her doctor. Her doctor says she has severe asthma and stressful situations will trigger it. The doctor orders albuterol to be filled at a local pharmacy and directs the case worker to pick up the prescription on the way to the daughter's home where she is hiding in the closet.

Example 4

This example illustrates emergency services job linking by means of additional information: A doctor calls 911 on behalf of a patient with respiratory symptoms and acute rash, the doctor updates the reason for the call in the emergency services job webpages created for the call. A man with an app for appending information to the caller name field of an ALI database record calls 911 for shortness of breath and an acute rash. A woman 2 miles away calls 911 after causing her phone's ALI database record to be updated with "I can't breathe" in the caller name field. T911 servers query the timestamp, location, symptoms, and other information and flag a possible public health issue. Responders identify a local manufacturing plant that had a leak over the weekend. Police clear the downwind area and engineers fix the problem.

Example 5

Figure 8:
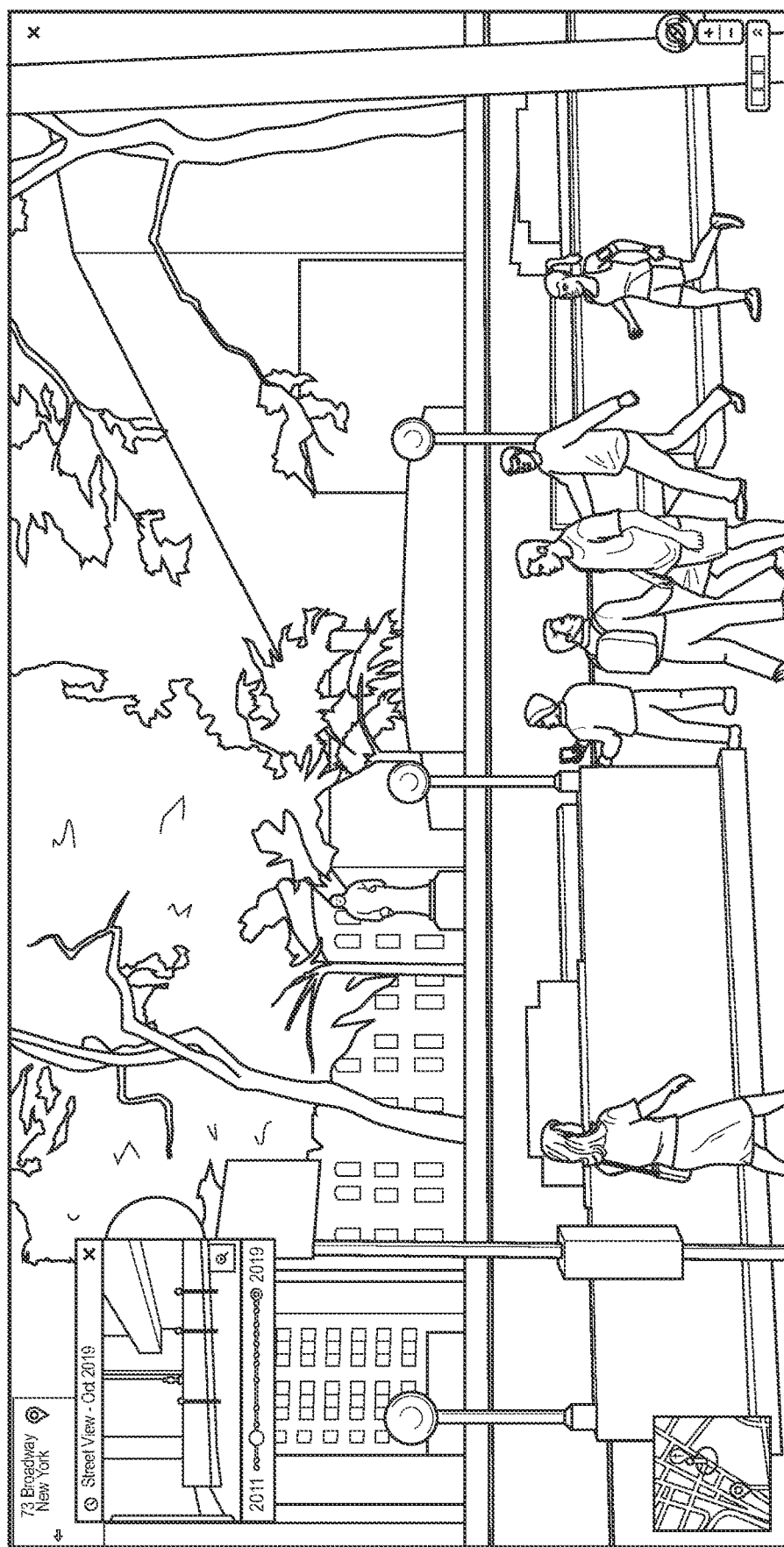
FIG. 8 is a depiction of a patient experiencing a medical emergency used to illustrate Example 5.

A person is experiencing an emergency but is unsure of their current location. A user can ping the location by using an html link which can be texted to the person's cell phone, which when opened, queries the current location of the cell phone, and sends it back to the person doing the request. The estimated location can then be displayed on a map, viewed via historical or real time street view pictures, and used in combination with oral questions, video conferencing to view the surroundings, and landmark references to refine a more detailed location of the person and emergency surrounding situation for an emergency response. In FIG. 8 a patient is having chest pain in a cemetery while on a telemedicine visit. The patient does not know the address of where he is. The doctor pings the location of the patient's smartphone returning the street address of a coffee shop a block away from the cemetery and church. Crowded cities often have poor GPS accuracy. The doctor further pulls static view historical pictures from that location to reveal pictures of the cemetery from the last few years using common databases such as google maps, apple maps connect, and Microsoft StreetSide Bing maps. The doctor says "Are you next to the green statue of the man? Sit next to it." The doctor views a real time video conference with the patient showing he is wearing a red shirt and has blonde hair displaying his background next to the statue in the park. The doctor confirms verbally with the patient that he is sitting behind the statue in the park. The street views also show an opening to the cemetery fence at the verge of the cemetery and the church on the right side of Broadway ave. An alphanumeric characters field in the ALI database is updated with "Next to statue in cemetery, red shirt, blonde hair, enter on right." Paramedics arrive on scene and go directly to the patient with the red shirt and blonde hair behind the statue saving several minutes of searching for the patient. Paramedics log into T911code.com via the code updated to the ALI alphanumeric character field and see a picture of the patient and link to the video link to talk directly to the patient and doctor over video.

The foregoing examples are meant to be illustrative only. The systems and methods described herein can be used in a variety of other applications, including those in which subscribers or patients are traveling or mobile and have a defined schedule that can be used to geocode their locations.

Example 6

The methods and systems described herein can be used to improve handoffs between emergency service providers by allowing communications that could only made orally heretofore to also be made in writing. Regulatory bodies such as the Joint Commission have required both written and verbal communication in the handoff of patient care. It has been shown in multiple medical literature sources, including the New England Journal of Medicine, that including both verbal and written communication in handoff procedures reduces medical error, reduces adverse events, and improves patient outcomes. For a telemedicine provider handing off to the 911 emergency services system, many errors occur often. One example of oral only communication and error occurred during an emergency in which a woman living in her car was trapped in a snow storm at 67 Lincoln Park. After the woman dialed 911, she used her mobile phone to report the location of her car to a PSAP Operator who incorrectly logged her address to first responders as 67 Lincoln Street. Because no first responders arrived, the woman called 911 multiple times. First responders showed up to 67 Lincoln Street, no one was there, and they left. On the fifth try they realized they were going to the wrong address. Ambulance EMS Protocol is "If no one is at the location, they leave for another call." The woman was lucky in that she survived to tell of the 911 error. Since 911 does not track or follow up on calls where they leave the scene, if she died no one would have known of the error. In certain examples of using the methods and systems described herein, the woman's phone would be provided with an executable application that allows her to enter her address. The address would then be communicated to an emergency services server which would append the address entered by the woman in the caller name field. The written address would then be transmitted to the PSAP to whom her emergency services call was placed and displayed in the caller name field as shown in FIG. 2 so that the PSAP operator could direct emergency services personnel to the correct address.

Example 7

Regulatory Bodies such as the Joint Commission have been determined that standardizing communications during handoffs between emergency services responders and other emergency services providers or medical professionals provides more consistent and better patient outcomes. However, the choice of content topics and the method of how to present information concerning the standard content topics and/or the form of the information is difficult to develop especially in a uniform for a system used to provide emergency services across multiple geographic locations and for multiple patients. In accordance with the systems and methods described herein, dynamic content is built based on correlations between the methods of delivery and forms of content associated with particular content topics and emergency services outcomes. In this example, a standardized script used by a telemedicine doctor to communicate the details of an emergency to a PSAP operator is provided. The script includes check boxes that are used to indicate whether any particular statement should be communicated to the handoff recipient. The individual statements that are actually made by the treating physician are recorded by the physician's communication device, digitized, transmitted to the emergency services server and stored in a database for comparison to references statements in reference files. Based on the comparison, a flag (ON/OFF) is set for each statement and stored in a record along with an observed emergency services outcome (which may also be a flag indicating whether a particular desired outcome was achieved). The emergency services serve executes correlation algorithms correlating the usage of each statement with the occurrence of the desired emergency services outcome. Correlation coefficients are calculated for each value of the flag (ON/OFF) to determine whether using the statement achieves a desirable outcome more frequently than not using the statement. Based pm that determination, the script may be altered such as by automatically changing which boxes checked off next to which statements. Below is an example of checkboxes on the terminal display directing both verbal and written communication with a PSAP operator.

911 Dispatch: "911, Where is your emergency?"

Treating Physician: "You are on a recorded line. Please confirm the address you see is: 227 Mockingbird Lane.

911 Dispatch: "I confirm the address is on my screen. What is the emergency?"

Treating Physician:

"This is [state your name]." "I have/am [state your credentials]."

I am activating 911 for my patient, [state the patient name]"

"The patient has had a [state the emergency condition, severity, and vital signs if any]."

"I would like an [describe units needed, e.g., ALS, BLS, Police] sent,"

"Identifying information includes [state the patient's age, race, gender, hair color, clothes, and witness/guardians."

"Safety concerns for first responders are [weapons on site, patient agitation, no capacity to make decisions, environment safety concerns, or NONE]."

"I have asked the patient to wait outside" (preferred) or "the patient is in (on)" [state location detail rear bedroom floor, 4th floor apartment, office bathroom, sidewalk, front stairwell]

"Responders may need [forced entry, forced custody, CPR, Intubation, bleeding control, agitated patient control, or no additional actions onsite]."

"I request onsite responders obtain [pill bottles, medical devices, special pacemaker ID cards, or nothing on site]."

"The resuscitation status is [Full Code, DNR, DNI, or Unknown]"

"I request the patient be brought to [state destination facility] because the patient needs [state medical rationale: a cardiac center, continuity of care, toxicology]. If the patient decompensates, bring the patient to the nearest ED."

"The patient has a history of [state patients diagnoses, medications, allergies, pertinent dated results, and other pertinent history]."

"My callback number is [enter callback number]:

"I am going to call the destination facility now, can you confirm which facility the patient will be sent to?"

"Do you need any other information from me?"

Stay on the line with your patient and 911 dispatch until first responders arrive. If the 911 dispatcher releases you, stay on with the patient until first responders arrive.

Thus, the specific statements that are used can be correlated to the emergency services outcomes for particular content topics, and the correlation coefficients can be used to refine the set of statements that are selected for an emergency that relates to those content topics.

Example 8

As indicated above, the systems and methods described herein may be used to provide information to PSAP operators during handoffs from another emergency services provider to a PSAP operator. However, they are also useful or handoffs from a PSAP operator to another medical services provider. In this example, the PSAP receives an emergency services call from a 45 year old Spanish speaking woman located in California complaining that she ran out of her medications. The PSAP operator realizes that the situation prompting an emergency services call to the PSAP is not actually an emergency and can be handled by a telemedicine provider. The telemedicine provider will be one of several telemedicine provider groups that belong to a larger, centralized telemedicine organization. The PSAP operator will handoff (transfer) the call to the centralized telemedicine organization but will want to convey the information necessary for the centralized telemedicine organization to select an appropriate one of its groups to actually conduct a telemedicine visit with the patient.

The PSAP operator is provided with a PC with internet access that operatively connects the PC to a remote server that receives information from the PSAP operator and conveys it to the centralized telemedicine provider organization. The PSAP operator receives a job code in the ALI database caller name field for the communication device that initiated the emergency services call received by the PSAP. The PSAP's PC will display the interface of FIG. 4 so the PSAP operator can launch the job file web pages and receive the information provided by the emergency services provider or medical services provider that initiated the call to the PSAP.

A database comprising all participating telemedicine provider groups administered by the centralized telemedicine organization is provided and is operatively connected to the remote server. The database comprises records that include fields for the group name, active/inactive status, state licensure, treating age range, languages, and other parameters. Each provider is codified into a group type encoded by a group code. For example, group code: INDOENIRTG may be for providers who are licensed in California, speak Spanish, treating patients ages 12 to 65, in active status. A database of patients whose information can be automatically updated or entered via a display on a PC at the centralized telemedicine organization. The group codes will be known to the PSAP operators and provide a short hand way of entering the necessary telemedicine provider characteristics.

Using a program resident on the PC or on the remote server, the PSAP operator will interact with the interface to update the job file web pages to include the INDOENIRTG group code. When the call is transferred to the centralized telemedicine organization, the program will also generate a message such as the one shown in FIG. 4 on a computer display at the centralized telemedicine organization and will provide an interface that the organization can use to launch the job file web pages. Using the group code received in the job file web pages, the centralized telemedicine organization can then select an appropriate provider group to conduct the telemedicine visit. Calls can be provided in a queue to the active providers in a round robin form, triaged based on severity, or allocated by another method.

Example 9

The methods and systems described herein can be used to repurpose 911 Systems as Hospital at Home National Code Blue Patient Safety System. Hospital at Home has become much more popular in 2021 since the COVID-19 pandemic. However, safely providing hospital services at home is a significant concern. Although, many of the same hospital testing and treatments can be obtained in the home and in the community, some means of handling emergencies is required. The Hospital at Home system would include a mechanism for hacking a content-specified text field of an ALI database record as described herein and would also include a database of active patients, a database of active healthcare staff with permission to add and remove active patients, an ALI call routing system, and an ALI database text field hacking system. In accordance with this example, a doctor admits a patient to hospital at home. The patient obtains testing in the community in different cities and perhaps even across state lines. If the patient has an emergency, the patient or a mobile physiological data device would dial 911. One example of a mobile physiological data device suitable that can measure physiological data and initiate a call to an emergency services number is the CARDIAC LINX© ECG device supplied by Ross Medical Corporation which has a phone that can dial an emergency services number or which can be used with a companion mobile phone and configured to cause the mobile phone to dial the emergency services number. In this example, there is no updating of ALI database records to discordant records since the patient is in the same PSAP zone as the PSAP operator who receives the call. Text hacking of a content-specified ALI database text field in the record containing the calling device's calling number (e.g., ANI or p-ANI) provides the PSAP operator with the text information of the current emergency and the caller's admission history. Such information may include, for example, information pertaining to the nature of the emergency, medical history, and other critical handoff information. The PSAP operator then determines if a true emergency is present and dispatches the appropriate ambulance if one is present. If the PSAP operator determines that there is no emergency, he or she hands back (transfers) the call to a telemedicine service provider such as a doctor on the admission team or a covering doctor) PSAP operators and ambulances are similar to hospital code blue teams in that they operate 24/7, have an 8 to 12 minute response time to emergencies, have basic healthcare staff that can perform advanced cardiac life support, and usually do not have the originating attending physician on the code team. Communities are similar to hospitals in that they both have the same CT scan machines, labs, MRI machines, and doctors. ALI database text-field hacking enables 911 infrastructure to become a national code blue system for hospital at home by linking critical information through the 911 call which is the only universal way 911 systems receive information.

What is claimed is:

1. A method of providing emergency services to a person or property experiencing an emergency, comprising:
updating an automatic location identification (ALI) database content-specified text field in an ALI database record that includes a calling number field with a calling number of a communication device, wherein the updating step comprises adding alphanumeric characters indicative of the nature of the emergency to the content-specified text field, wherein a unique link is sent to a communication device of the person experiencing the emergency, whereby when the unique link is activated, the person's GPS and two tower mobile phone/computer locations from the person's communication device are queried to obtain returned GPS and two tower mobile phone/computer location values, and the returned GPS and two tower mobile phone/computer location values are sent from the communication device to a medical services provider requesting emergency medical services for the person to assist in verifying the location of the person experiencing the emergency.

2. The method of claim 1, wherein the alphanumeric characters indicative of the nature of an emergency indicate at least one of a medical condition, a medical test result, a medical diagnosis, a medical professional, a medical facility, a type of medical response, a level of care, a direction to a first responder, and a web address.

3. The method of claim 1, further comprising querying a database of photos and media using the returned GPS and two tower mobile phone/computer location values to obtain returned photo and media data, and updating the content-specified ALI database text field based on the returned photo and media data or updating a content of at least one job file web page based on the returned photo and media data.

4. The method of claim 2, wherein the web address is a link to a video conference session.

5. The method of claim 1, further comprising entering an emergency services number into the communication device, thereby placing a call to a public safety access point (PSAP) having at least one terminal operatively connected to the automatic location identification database and operable to display the contents of the caller name field from the automatic location identification database record.

6. The method of claim 1, wherein the alphanumeric characters indicative of the nature of an emergency comprise an alphanumeric code that encodes at least one of service provider credentials, patient medical data, a videoconference web link, personnel on site identities, disaster information, and hazards.

7. A method of providing emergency services to a person or property experiencing an emergency, comprising:
updating an automatic location identification (ALI) database content-specified text field in an ALI database record that includes a calling number field with a calling number of a communication device, wherein the updating step comprises adding alphanumeric characters indicative of the nature of the emergency to the content-specified text field;
storing data indicating whether content related to an emergency was delivered during a handoff in a corresponding database record field, wherein the database record further comprises a field describing the content related to the emergency and a field comprising data indicating whether an emergency services outcome was achieved.

8. The method of claim 7, wherein the emergency services outcome is selected from the group consisting of delays in providing care, arrival at an appropriate destination facility, arrival of an appropriate level and type of first responder on site, patient death, assault on first responders, and delays in forced entry.

9. The method of claim 1, wherein the content-specified text field is a caller name field.

10. The method of claim 1, wherein the content specified for inclusion in the content-specified text field is not content describing the nature of the emergency.

11. The method of claim 10, wherein the content in the content-specified text field is the content specified for inclusion in the content-specified text field.

12. A system comprising:
at least one emergency services server, the at least one emergency services server comprising at least one processor and at least one non-transitory computer readable memory having computer executable instructions stored thereon, wherein when executed by the at least one processor, the computer executable instructions perform the following steps:
receiving an alphanumeric characters string indicative of a content of a content-specified ALI database text field and a nature of the emergency, wherein the content of the content-specified ALI database text field is not the nature of the emergency; and
updating the content-specified ALI database field in an ALI database record that includes a calling number field for a communication device with the alphanumeric characters string indicative of the content of the content-specified ALI database field and the nature of the emergency, such that when a call is placed by entering emergency services number into the communication device, a public safety answering point (PSAP) receiving the call can display the updated ALI database content-specified text field on a PSAP 911 terminal, wherein when executed by the at least one processor, the computer executable instructions perform the further step of modifying standard deliverable content for delivery during a handoff based on correlations of a usage of the standard deliverable content and achievement of desired emergency services outcomes.

13. The system of claim 12, wherein when executed by the at least one processor, the computer executable instructions further perform the following steps:
receiving at least one of a services provider identifier, a treatment facility name, a treatment facility name, a treatment facility type, a service provider phone number, level of care, and an identifier of a person experiencing the emergency;
generating a job code that corresponds to the emergency;
generating at least one job file web page corresponding to the job code, wherein the at least one job file web page displays at least one of information identifying the person experiencing the emergency, real time physiologic data for the person experiencing the emergency, medical records for the person experiencing the emergency, a treatment facility name, a treatment facility type, service provider information, on-site personnel names, disaster information, hazard information, a level of care, and a videoconference link.

14. The system of claim 12, wherein the at least one emergency services server is operatively connected to at least one of a service provider credential database and a medical records database.

* * * * *

UNITED STATES PATENT AND TRADEMARK OFFICE
CERTIFICATE OF CORRECTION

PATENT NO. : 12,219,092 B2  
APPLICATION NO. : 18/142755  
DATED : February 4, 2025  
INVENTOR(S) : Alexander Ross Chiu et al.

Page 1 of 1

It is certified that error appears in the above-identified patent and that said Letters Patent is hereby corrected as shown below:

In the Claims

Column 30, Line 8, after "treatment facility name," delete "a treatment facility name,"

Signed and Sealed this  
Fourth Day of March, 2025

Coke Morgan Stewart  
*Acting Director of the United States Patent and Trademark Office*